United States Patent [19]
Coolbaugh et al.

[11] Patent Number: 5,306,780
[45] Date of Patent: Apr. 26, 1994

[54] SOLID BLOCK ELASTOMERIC COPOLYMERS

[75] Inventors: Thomas S. Coolbaugh, Morrisville; Frederick C. Loveless, Yardley, both of Pa.; Demetreos N. Matthews, Ewing, N.J.

[73] Assignee: Mobil Oil Corporation, Fairfax, Va.

[21] Appl. No.: 29,507

[22] Filed: Mar. 11, 1993

Related U.S. Application Data

[62] Division of Ser. No. 952,127, Sep. 25, 1992, Pat. No. 5,268,427, which is a division of Ser. No. 466,233, Jan. 16, 1990, Pat. No. 5,187,236.

[51] Int. Cl.$^5$ ............................................. C08F 297/04
[52] U.S. Cl. ................................... 525/314; 525/98; 525/940
[58] Field of Search ........................................ 525/314

[56] References Cited

U.S. PATENT DOCUMENTS

| | | | |
|---|---|---|---|
| 3,577,357 | 5/1971 | Winkler | 525/314 |
| 3,823,109 | 7/1974 | Middlebrook | |
| 3,985,826 | 10/1976 | Futamura | |
| 4,116,917 | 9/1978 | Eckert | |
| 4,134,928 | 1/1979 | Moczygemba | |
| 4,162,241 | 7/1979 | Canter et al. | |
| 4,413,098 | 11/1983 | Hattori et al. | 525/314 |
| 4,628,072 | 12/1986 | Shiraki et al. | 525/577 |
| 4,657,970 | 4/1987 | Shiraki et al. | 525/92 |
| 4,849,481 | 7/1989 | Rhodes et al. | 525/314 |
| 4,879,349 | 11/1989 | Hoxmeier | 525/332.8 |
| 4,898,914 | 2/1990 | Gergen et al. | 525/314 |
| 4,996,266 | 2/1991 | Bronn et al. | 525/271 |
| 5,159,022 | 10/1992 | Ikematu et al. | 525/314 |

FOREIGN PATENT DOCUMENTS

| | | |
|---|---|---|
| 0315280 | 5/1989 | European Pat. Off. |
| 56-127604 | 10/1981 | Japan |
| 328729 | 7/1989 | Japan |
| 1433990 | 4/1976 | United Kingdom |
| 2020670 | 11/1979 | United Kingdom |

OTHER PUBLICATIONS

Falk, Journal of Polymer Science: Part A-1, vol. 9, 2617-2623 (1971).
Falk et al., Die Angewandte Makromelekulare Chemie 21 (1972), 17-23 (No. 286).
Mohajer et al., "Hydrogenated linear block copolymers of butadiene and isoprene: effects of variation of composition and sequence architecture on properties," Polymer, 1982, vol. 23, Sep., 1523-1535.

*Primary Examiner*—Vasu S. Jagannathan
*Attorney, Agent, or Firm*—A. J. McKillop; M. D. 'Keen

[57] ABSTRACT

There is disclosed a linear block copolymer comprising at least one triblock I-B-I, wherein I is a block of a polymerized conjugated diene of at least 5 carbon atoms, such as isoprene, and B is a block of a polymer of a conjugated diene, different from that of formula (1), of at least 4 carbon atoms, such as 1,3-butadiene. The B block is selectively hydrogenated, while each of the I blocks retains a sufficient amount of its original unsaturation to vulcanize the copolymer. There is also disclosed an alternative linear block copolymer containing at least one triblock of the first polymer block made from an aryl-substituted olefin, such as styrene, and the conjugated diene used to polymerize the block I, the second middle polymer block of the diene used to polymerize the block B, and the third polymer block which is the same as the first polymer block. In this alternative copolymer, the middle block is also selectively hydrogenated, thereby leaving the terminal polymer blocks with a sufficient amount of double bonds to vulcanize the copolymer. The polymers can be crosslinked or functionalized through the terminal blocks containing the vinyl unsaturation. There are also disclosed random and star-branched block and random copolymers made from the same monomers as the linear block copolymers.

Also disclosed are methods of producing and selectively hydrogenating the polymers.

30 Claims, No Drawings

SOLID BLOCK ELASTOMERIC COPOLYMERS

This application is a divisional of application Ser. No. 07/952,127, filed Sep. 25, 1992 U.S. Pat. No. 5,268,427 which is a divisional of application Ser. No. 07/466,233, filed Jan. 16, 1990 and now U.S. Pat. No. 5,187,236.

This application is also related by subject matter to application Ser. No. 07/466,135, filed Jan. 16, 1990, now U.S. Pat. No. 5,149,895 and to application Ser. No. 07/466,136, filed Jan. 16, 1990.

The entire contents of application Ser. No. 07/466,136 are incorporated herein by reference.

BACKGROUND OF THE INVENTION

1. Field of the Invention

This invention is directed to novel elastomeric block copolymers having unsaturation only on the terminal blocks and methods of preparation thereof. More particularly, the invention is directed to solid elastomeric block copolymers comprising triblock units wherein the middle block of each triblock unit is substantially selectively hydrogenated and therefore contains substantially no unsaturated groups, while each of the terminal blocks of each triblock unit contains a sufficient amount of unsaturation for curing the block copolymers.

The invention is also directed to random copolymers which, when selectively hydrogenated, contain elastomeric molecules having substantially saturated backbones and random, pendant unsaturation.

The invention is additionally directed to chemically modified derivatives of the above block and random copolymers.

Crosslinking of the polymers of the invention produces vulcanizates having unusual properties, e.g., high elongation and excellent aging characteristics.

2. Description of Related Art

Elastomers (or rubbers) of either natural or synthetic origin usually require vulcanization for transformation into insoluble, non-deformable high strength elastomeric products. Before vulcanization, rubbers possess inferior properties and low strength which limit their utility.

There are a number of well known methods for achieving the vulcanization, also referred to as crosslinking, of unsaturated elastomers. Such methods include the use of sulfur and accelerators, peroxides, benzoquinone dioxime, certain phenolic resins and similar agents. Any of the above or any other well known vulcanizing techniques may be utilized to crosslink the elastomers of this invention.

The great majority of currently known synthetic elastomers are based on polymers or copolymers of butadiene or isoprene. These polymers, which include cis-polybutadiene, emulsion polybutadiene (EBR), styrene-butadiene copolymer (SBR), butadiene-acrylonitrile copolymer (NBR) and cis-polyisoprene, provide raw materials for the production of a very large volume of rubber goods, such as automotive tires, conveyor belts, adhesives, footwear, sponge and mechanical goods. Because of the high degree of unsaturation inherent in the polymeric backbones, these elastomers are easily and quickly vulcanizable alone or in blends. A secondary consequence of the high degree of backbone unsaturation is the instability of such elastomers in the presence of ozone and oxygen, both of which promote rapid deterioration of these elastomers.

Butyl rubber, which is a copolymer of isobutylene and 2-3% by weight (wt.) of isoprene, represents a class of elastomers far more resistant to oxygen and ozone than those based on butadiene or isoprene. The backbone of butyl rubber is primarily polyisobutylene (which provides a saturated spine) into which there is randomly copolymerized about 2-3% by wt. of isoprene to provide unsaturated sites for vulcanization. Butyl rubber finds limited use because of its relatively poor elastomeric properties, and is used primarily in applications which take advantage of its damping properties, weathering resistance and low gas permeability.

Ethylene-propylene-diene rubber (EPDM) has enjoyed substantial commercial growth as a synthetic rubber since it combines excellent oxidation resistance with good elastomeric properties. This elastomer is prepared by the polymerization of ethylene, propylene and a non-conjugated diene, such as 1,4-hexadiene, dicyclopentadiene or ethylidene norbornene. Diene incorporation is typically 5-10% by weight (wt.). The diene is randomly incorporated into the saturated ethylene-propylene backbone to provide pendant vulcanization sites.

The above prior art elastomers, with either high or low levels of unsaturation, are characterized in that, having random unsaturation, they are randomly crosslinked during vulcanization. The success of vulcanization in incorporating all molecular chains into the final crosslinked network with minimal "loose ends" is termed the degree of network perfection. An imperfect network, wherein crosslinks occur randomly and sometimes not near the end of a molecular chain, produces a vulcanized polymer having poor mechanical and elastomeric properties caused by chain ends which are not a part of the tightly bound network. In order to insure the highest degree of network perfection attainable, randomly unsaturated elastomers must be crosslinked extensively. The large number of crosslinks necessary (25 to 40 per 100,000 molecular weight) dictates that the average distance between crosslinks ($M_c$) must be relatively small in comparison with the dimensions of the whole molecule. Elastomeric properties, such as elongation, depend greatly on $M_c$—the smaller the $M_c$ the worse are the elastomeric properties, e.g., the lower the elongation of the vulcanized polymer.

Various block copolymers having excellent elastomeric properties, especially elongation, have been made in the past. For example, a block copolymer commonly known as KRATON, manufactured by Shell Chemical Company, which has outstanding properties at room temperature, is a thermoplastic elastomer consisting of block segments of polymerized styrene units and polymerized aliphatic diolefin units, such as butadiene or isoprene. The most common structure of KRATON is the linear A-B-A block, such as styrene-butadiene-styrene (S-B-S) or styrene-isoprene-styrene (S-I-S). One of such rubbers is believed to be described by Jones, U.S. Pat. No. 3,431,323. Jones discloses block copolymers containing block segments of polymerized vinyl arene monomer units, e.g., styrene, butadiene monomer units, and vinyl arene units. After the block copolymer is prepared, it may be subjected to hydrogenation to such a degree that the unsaturation of the polybutadiene block is reduced to less than 10% of its original value, while 10-25% of the poly-vinyl arene block segments are hydrogenated. Although the KRATON triblock copolymers have excellent elastomeric properties at room temperature, since they are thermoplastic materials they lose these properties at temperatures of about 80° C. (and higher). In addition, since these polymers are not chemically crosslinked, they are soluble in many organic solvents. These latter two deficiencies place some restrictions on the viable areas of application for these polymers.

Falk, JOURNAL OF POLYMER SCIENCE: PART A-1, Volume 9, 2617-2623 (1971), the entire contents of which are incorporated herein by reference, discloses a method of selectively hydrogenating 1,4-polybutadiene units in the presence of 1,4-polyisoprene units. More particularly, Falk discloses selective hydrogenation of the 1,4-polybutadiene block segment in the block copolymer of 1,4-polybutadiene—1,4-polyisoprene—1,4-polybutadiene and in random copolymers of butadiene and isoprene, with both polymerized monomers having predominately 1,4-microstructure. Selective hydrogenation is conducted in the presence of hydrogen and a catalyst made by the reaction of organoaluminum or lithium compounds with transition metal salts of 2-ethylhexanoic acid.

Falk, DIE ANGEWANDTE CHEMIE 21 (1972) 17-23 (No. 286), the entire contents of which are also incorporated herein by reference, discloses the selective hydrogenation of 1,4-polybutadiene segments in a block copolymer of 1,4-polybutadiene-1,4-polyisoprene-1,4-polybutadiene.

Hoxmeier, Published European Patent Application 88202449.0, filed on Nov. 2, 1988, Publication Number 0 315 280, published on May 10, 1989, discloses a method of selectively hydrogenating a polymer made from at least two different conjugated diolefins. One of the two diolefins is more substituted in the 2,3 and/or 4 carbon atoms than the other diolefin and produces tri- or tetra-substituted double bond after polymerization. The selective hydrogenation is conducted under such conditions as to hydrogenate the ethylenic unsaturation incorporated into the polymer from the lesser substituted conjugated diolefin, while leaving unsaturated at least a portion of the tri- or tetra- ethylenic unsaturation incorporated into the polymer by the more substituted conjugated diolefin.

Mohajer et al., *Hydrogenated linear block copolymers of butadiene and isoprene: effects of variation of composition and sequence architecture on properties*, 23 POLYMER 1523-1535 (September 1982) disclose essentially completely hydrogenated butadiene-isoprene-butadiene (HBIB), HIBI and HBI block copolymers in which butadiene has predominantly 1,4-microstructure.

Kuraray K K, Japanese published patent application Number JP-328729, filed on Dec. 12, 1987, published on Jul. 4, 1989, discloses a resin composition comprising 70-99% wt. of a polyolefin (preferably polyethylene or polypropylene) and 1-30% wt. of a copolymer obtained by hydrogenation of at least 50% of unsaturated bond of isoprene/butadiene copolymer.

Heretofore, the art has failed to produce a polymer having a saturated backbone for oxidation stability which has unsaturated bonds only on the ends of the block polymer chain. Such a block polymer could be vulcanized or selectively functionalized at the terminal ends thereof. The functionalization would expand the utility of the polymer.

SUMMARY OF THE INVENTION

In one embodiment of the invention, there is provided a high molecular weight, solid block compolymer comprising at least three alternating blocks:

$$(I)_x-(B)_y-(I)_x$$

wherein I is a block of at least one polymerized conjugated diene having at least five (5) carbon atoms and the following formula $$R^1-C=C-C=C-R^6 \quad (1)$$
$$\phantom{R^1-}| \phantom{=C-}| \phantom{C=}| \phantom{C-}|$$
$$\phantom{R^1-C=}R^2 \phantom{C-}R^3 \phantom{C=}R^4 \phantom{C-}R^5$$

wherein $R^1$-$R^6$ are each hydrogen or a hydrocarbyl group, provided that at least one of $R^1$-$R^6$ is a hydrocarbyl group and further provided that the structure of the residual double bond in the polymerized block I has the following formula $$\begin{array}{c} R^{II} \\ | \\ R^{I}-C=C-R^{III} \\ | \\ R^{IV} \end{array} \quad (2)$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups; B is a block of a polymer of at least one conjugated diene, different from that used to polymerize the I block, having at least four (4) carbon atoms and the following formula $$R^7-C=C-C=C-R^{12} \quad (3)$$
$$\phantom{R^7-}| \phantom{=C-}| \phantom{C=}| \phantom{C-}|$$
$$\phantom{R^7-C=}R^8 \phantom{C-}R^9 \phantom{C=}R^{10} \phantom{C-}R^{11}$$

wherein $R^7$-$R^{12}$ are each hydrogen or a hydrocarbyl group, provided that the structure of the residual double bond in the polymerized conjugated diene of formula (3) (block B) has the following formula $$\begin{array}{c} R^b \\ | \\ R^a-C=C-R^c \\ | \\ R^d \end{array} \quad (4)$$

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group; x is 1-100, preferably 2-100, most preferably 2-30, and y is 300-35,000, preferably 1,000-5,000, and most preferably 1,500-4,000.

It will be apparent to those skilled in the art that in the residual double bond of formula (2) R', R'', R''' and $R^{IV}$ may all be hydrocarbyl groups. The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Examples of suitable conjugated dienes used to polymerize the I block are isoprene, 2,3-dimethyl butadiene, 2-methyl-1,3-pentadiene or myrcene. The hydrocarbyl groups in formulae (3) and (4) are the same as those described above in conjunction with the discussion of formulae (1) and (2). Suitable conjugated dienes used to polymerize the B block are 1,3-butadiene or 1,3-pentadiene. After the polymerization is completed, the block polymer is hydrogenated, so that the B block is selectively hydrogenated to such an extent that it contains substantially none of the original unsaturation, while each of the blocks I retains a sufficient amount of its original unsaturation to cure (or vulcanize) the block copolymer. The block copolymer is terminated at both ends with a block I.

In an alternative embodiment, there is provided a block copolymer comprising at least three alternating blocks:

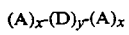
$(A)_x-(D)_y-(A)_x$ wherein the A block is a random or block copolymer of at least one aryl-substituted olefin, such as styrene, 2-phenyl alpha-olefins, alkylated styrene, vinyl naphthalene or alkylated vinyl naphthalene, and at least one conjugated diene of formula (1), discussed above, such as isoprene, 2,3-dimethyl butadiene, 2-methyl-1,3-pentadiene or myrcene; and D is a block of a polymer of at least one conjugated diene of formula (3), discussed above, which is different from the conjugated diene of formula (1), e.g., 1,3-butadiene or 1,3-pentadiene. When the block A has molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the block A has molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the block A has molecular weight of about 350 to about 7,500, x represents the total number of monomer units in the block A, such that the block copolymer comprises about 0.25 to about 10%, preferably about 2 to about 10% wt. of the A blocks, and y represents the total number of monomer units in the block D, such that the block copolymer comprises about 80 to about 99.5%, preferably about 80 to about 96% wt. of the D blocks. When the block A has molecular weight of about 7,500 to about 20,000, the block copolymer comprises about 0.25 to about 25%, preferably about 10 to about 20% wt. of the A blocks and about 50 to about 99.5%, preferably about 60 to about 80% wt. of the D blocks. After this block copolymer is polymerized, it is hydrogenated, so that the block D is selectively hydrogenated to such an extent that it contains substantially none of the original unsaturation, while each of the blocks A retains a sufficient amount of the original unsaturation of the conjugated diene present in each of the A blocks to cure the block copolymer. The block copolymer of this embodiment is terminated at both ends with a block A.

Yet another embodiment is directed to a block copolymer comprising at least three alternating blocks:

I-D-A where the blocks I, D and A are made from the same respective monomers defined above, and the block A was molecular weight of about 350 to about 7,500. The block copolymer comprises about 0.1 to about 50%, preferably about 1 to about 5% by weight (wt.) of the sum of blocks I and A, and about 50 to about 99.9%, preferably about 95 to about 99% wt. of the block D.

The blocks A and I are referred to hereinafter as the "terminal blocks", and the blocks B and D as the "middle blocks".

Another embodiment of the invention is directed to a random copolymer of at least one conjugated diene of formula (1) and at least one conjugated diene of formula (3), both discussed above, provided that the diene of formula (3) is different from the diene of formula (1). This random copolymer contains about 0.1 to about 25, preferably about 0.1 to about 5%, by mole of the polymerized conjugated diene of formula (1) and about 75 to about 99.9, preferably about 95 to about 99.9%, by mole of the conjugated diene of formula (3). This random copolymer is also selectively hydrogenated so that the polymerized diene of formula (3) contains substantially none of the original unsaturation, while the polymerized diene of formula (1) retains a sufficient amount of the original unsaturation to cure the random copolymer.

Another embodiment of this invention is directed to random copolymers of at least one aryl-substituted olefin, at least one conjugated diene of formula (1) and at least one conjugated diene of formula (3), both discussed above, provided that the conjugated diene of formula (1) is different from the conjugated diene of formula (3). This random copolymer contains about 0.1 to about 15% by mole of the aryl-substituted olefin, about 0.1 to about 25%, preferably about 0.1 to about 5%, by mole of the conjugated diene of formula (1), and the remainder of the conjugated diene of formula (3). This random copolymer is also selectively hydrogenated, so that the polymerized diene of formula (3) contains substantially none of the original unsaturation, while the polymerized diene of formula (1) retains a sufficient amount of the original unsaturation to cure the random copolymer.

Yet another embodiment of the invention is directed to star-branched block and random polymers. The star-branched block polymers are made from any combination of blocks I and B, A and D, or I, D and A providing that each free end (i.e., uncoupled end) of the star polymer is either an I or an A block, respectively. The star-branched block polymers are selectively hydrogenated to such an extent that blocks B or D contain substantially none of the original unsaturation, while each of the blocks I or A, respectively, retains a sufficient amount of the original unsaturation of the polymerized conjugated dienes present therein to cure the star-branched block polymers.

The star-branched random polymers are made from any combination of dienes of formulae (1) and (3), providing that the diene of formula (3) is different from the diene of formula (1), or from at least one aryl-substituted olefin, a diene of formula (1) and a diene of formula (3), providing that the diene of formula (3) is different from the diene of formula (1). The star-branched random polymers are selectively hydrogenated, so that the polymerized diene of formula (3) contains substantially none of the original unsaturation, while the polymerized diene of formula (1) retains a sufficient amount of the original unsaturation to cure the star-branched random polymers.

The copolymers of all embodiments are prepared under anionic polymerization conditions. After the selective hydrogenation reaction, the hydrogenation catalyst is removed from the polymer.

In all embodiments of this invention, whenever a reference is made to the "residual double bond" of the block or random polymer (or copolymer), it is understood to be the residual double bond prior to the selective hydrogenation reaction. The structure of the residual double bond can be determined in any conventional manner, as is known to those skilled in the art, e.g., by infrared (IR) analysis.

The term "original unsaturation", as used in this application, means the sum total of the unsaturated groups present in the copolymer prior to the selective hydrogenation reaction. The unsaturation can be quantified in any conventional manner, e.g., by reference to the Iodine Number of the polymer. For example, for a tri-block copolymer of the first embodiment wherein the I blocks are polyisoprene and the B block is polybutadiene, the Iodine Number before selective hydrogenation for each of the I blocks is 373 and for the B block it is 470. After selective hydrogenation is completed, the Iodine Number for each of the I blocks is about 37 to about 373, preferably about 93 to about 373, more preferably about 186 to about 373, and most preferably about 373, and for the B block it is about 0 to about 50, and preferably about 0 to about 2.5.

In any polymers of any of the embodiments of this invention, the microstructure of the polymerized conjugated diene of formula (3), e.g., blocks B or D in the block copolymers, must be such that the polymer is not excessively crystalline after the selective hydrogenation reaction, i.e., after the selective hydrogenation reaction, the polymer must retain its elastomeric properties, e.g., the polymer should contain no more than about 10% of polyethylene crystallinity. This is accomplished by introducing side branches into the polymerized conjugated diene of formula (3), e.g., by controlling the microstructure of 1,3-butadiene if it is the predominant monomer in the diene of formula (3), by using a mixture of dienes of formula (3) containing less than predominant amounts of 1,3-butadiene, or by using a single diene of formula (3) other than 1,3-butadiene. More particularly, if the conjugated diene(s) of formula (3) is predominantly (at least 50% by mole) 1,3-butadiene, the side branches are introduced into the polymer by insuring that the polymerized diene of formula (3) contains a sufficient amount of the 1,2-units to prevent the selectively hydrogenated polymer from being excessively crystalline. Thus, if the conjugated diene of formula (3) is predominantly (at least 50% by mole, e.g., 100% by mole) 1,3-butadiene, the polymerized diene of formula (3), prior to the selective hydrogenation reaction, must contain not more than about 75% wt., preferably about 10 to about 70% wt., and most preferably about 35 to about 55% wt. of the 1,4-units (1,4-microstructure), and at least about 25% wt., preferably about 30 to about 90% wt., and most preferably about 45 to about 65% wt. of the 1,2-microstructure. If the polymerized diene(s) of formula (3) contains less than 50% by mole of 1,3-butadiene, e.g., 1,3-pentadiene is used as the only diene of formula (3), the microstructure of the polymerized diene of formula (3) prior to the selective hydrogenation reaction is not critical since after hydrogenation the resulting polymer will contain substantially no crystallinity.

In all embodiments of the invention, mixtures of dienes of formulae (1) or (3) may be used to prepare block copolymers $(I)_x$-$(B)_y$-$(I)_x$, $(A)_x$-$(D)_y$-$(A)_x$ or I-D-A, any of the random copolymers or star-branched block and random polymers of this invention. Similarly, mixtures of aryl-substituted olefins may also be used to prepare block, random or star-branched copolymers of this invention. Accordingly, whenever a reference is made herein to a diene of formulae (1) or (3) or to an aryl-substituted olefin, it may encompass more than one diene of formulae (1) or (3), respectively, and more than one aryl-substituted olefin.

DETAILED DESCRIPTION OF THE INVENTION

The block copolymers of this invention comprise three or more alternating blocks, identified above. However, block copolymers having more than three blocks are contemplated herein, although they do not appear to exhibit better properties than the block copolymers containing only three blocks. In addition, star-branched block polymers containing any combination and number of blocks I and B, A and D or I, D and A are also contemplated herein, providing that they are terminated either by blocks I or A. The middle block of each three block unit of the block copolymer is substantially completely saturated, while the terminal blocks contain controlled levels of unsaturation, providing a hydrocarbon elastomer with $\alpha$-$\omega$ unsaturation. The length of the middle saturated block defines the distance between crosslinks ($M_c$) in the vulcanized elastomers. Because of the $\alpha$-$\omega$ placement of the unsaturation, very low levels of residual double bonds are required to attain excellent vulcanization. The low level of unsaturation in the selectively hydrogenated tri-block polymer and its terminal positioning provide excellent oxidative stability to the polymers of this invention.

Without wishing to be bound by any theory, it is believed that the $\alpha$-$\omega$ placement of unsaturation in the block polymers of this invention imparts to the polymers excellent elastomeric properties which were absent in prior art thermosetting elastomers which required a multiplicity of relatively closely spaced crosslinks.

The combination of elastomeric properties and oxidative stability possessed by the polymers of this invention makes them suitable for many end uses, such as dynamically vulcanized thermoplastic elastomer blends, belts and hoses, white tire sidewalls, roofing, liners, impact modifiers, mechanical goods, and ionic thermoplastic elastomers.

Many variations in composition, molecular weight, molecular weight distribution, relative block lengths, microstructure, branching, crystallinity and Tg (glass transition temperature) attainable with the use of the anionic techniques employed in the preparation of our polymers will be obvious to those skilled in the art.

While not wishing to limit the molecular weight range of solid elastomers prepared according to our invention, the minimum molecular weight for these solid polymers is at least about 15,000, preferably it is about 50,000 to about 2,000,000, more preferably about 80,000 to about 250,000 and most preferably about 100,000. The block copolymers of this invention are vulcanizable. Without wishing to be bound by any theory of operability, it is believed that they can be cross-linked (or vulcanized) in a controlled manner through the unsaturated groups on the terminal blocks to provide a very strong and orderly matrix of crosslinkages having almost uniform distribution of molecular weights between crosslinks. $M_c$. The random and star-branched copolymers of this invention are also vulcanizable. The designation $M_c$, as used herein for the block copolymers means the length of the middle block. For random copolymers, $M_c$ is calculated by dividing number average molecular weight, $M_n$, of the polymer by the average number of crosslinks per chain plus 1.

The invention will be described hereinafter in terms of the embodiments thereof summarized above. However, it will be apparent to those skilled in the art, that the invention is not limited to these particular embodiments, but, rather, it covers all of the embodiments encompassed by the broadest scope of the description of the invention.

Block Copolymers From at Least Two Dissimilar Conjugated Dienes

In this embodiment of the invention, there is polymerized a block copolymer comprising at least three alternating blocks:

$$(I)_x\text{-}(B)_y\text{-}(I)_x$$

wherein:

I is a block of at least one polymerized conjugated diene having at least five (5) carbon atoms and the following formula $$R^1-C=C-C=C-R^6 \quad (1)$$
$$\phantom{R^1-}|\phantom{=}|\phantom{-}|\phantom{=}|$$
$$\phantom{R^1-}R^2\ R^3\ R^4\ R^5$$

wherein $R^1$-$R^6$ are each hydrogen or a hydrocarbyl group, provided that at least one of $R^1$-$R^6$ is a hydrocarbyl group, and further provided that the structure of the residual double bond in the polymerized block I has the following formula $$\begin{array}{c} R^{II} \\ | \\ R^{I}-C=C-R^{III} \\ | \\ R^{IV} \end{array} \quad (2)$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

B is a block of at least one polymerized conjugated diene, different from that used to polymerize block I, having at least four (4) carbon atoms and the following formula $$R^7-C=C-C=C-R^{12} \quad (3)$$
$$\phantom{R^7-}|\phantom{=}|\phantom{-}|\phantom{=}|$$
$$\phantom{R^7-}R^8\ R^9\ R^{10}R^{11}$$

wherein $R^7$-$R^{12}$ are each hydrogen or a hydrocarbyl group, provided that the structure of the residual double bond in the polymerized block B has the following formula $$\begin{array}{c} R^b \\ | \\ R^a-C=C-R^c \\ | \\ R^d \end{array} \quad (4)$$

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen and at least one of $R^a$, $R^b$, $R^c$ or $R^d$ is a hydrocarbyl group. In each of the I blocks, x is 1-100, preferably 2-100 and most preferably 2-30, i.e., each of the I blocks is polymerized from 1-100, preferably from 2-100, and most preferably from 2-30 monomer units. For some special applications, each of the I blocks is polymerized from 100-200 monomer units. The block polymers containing such large I blocks (i.e., containing 100-200 monomer units) have increased vulcanization rate, as compared to those containing smaller I blocks, and are co-vulcanizable with diene rubbers available in the art, e.g., polybutadiene and natural rubbers. The block polymers containing such large I blocks can be blended with diene rubbers by conventional methods and subsequently vulcanized to produce novel compositions of this invention. The resulting materials are expected to have increased oxidation and ozone degradation resistance as compared to known diene rubbers alone, and therefore are expected to be valuable materials for the production of white sidewalls of tires and similar articles.

In each of the B blocks, y is 300 to 35,000, preferably 1,000 to 5,000, and most preferably 1,500 to 4,000, i.e., each of the B blocks is polymerized from 300 to 35,000, preferably from 1,000 to 5,000, and most preferably from 1,500 to 4,000 monomer units.

In the residual double bond of formula (2), $R^I$, $R^{II}$, $R^{III}$ and $R^{IV}$ may all be hydrocarbyl groups. The structures of the residual double bonds defined by formulae (2) and (4) are necessary to produce copolymers which can be selectively hydrogenated in the manner described herein to produce the selectively hydrogenated block and random copolymers of this invention. The block copolymer comprises about 0.1 to about 50%, preferably about 1 to about 5%, by wt. of the I blocks, and about 50 to about 99.9%, preferably about 95 to about 99%, by wt. of the B blocks.

The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Suitable hydrocarbyl groups are alkyls of 1-20 carbon atoms, alkenyls of 1-20 carbon atoms, cycloalkyls of 5-20 carbon atoms, cycloalkenyls of 5-20 carbon atoms, aryls of 6-12 carbon atoms, alkaryls of 7-20 carbon atoms or aralkyls of 7-20 carbon atoms. Examples of suitable alkyl groups are methyl, ethyl, propyl, butyl, pentyl, hexyl, heptyl, octyl, decyl, methyl-decyl or dimethyldecyl. Examples of suitable alkenyl groups are ethenyl, propenyl, butenyl, pentenyl or hexenyl. Examples of suitable cycloalkyl groups are cyclohexyl or methylcyclohexyl. Examples of suitable cycloalkenyl groups are 1-, 2-, or 3-cyclohexenyl or 4-methyl-3-cyclohexenyl. Examples of suitable aryl groups are phenyl or diphenyl. Examples of suitable alkaryl groups are 4-methyl-phenyl (p-tolyl) or p-ethyl-phenyl. Examples of suitable aralkyl groups are benzyl or phenethyl. Suitable conjugated dienes of formula (1) used to polymerize the I block are isoprene, 2,3-dimethyl-butadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 2-hexyl-1,3-butadiene, 3-methyl-1,3-hexadiene, 2-benzyl-1,3-butadiene, 2-p-tolyl-1,3-butadiene or mixtures thereof, preferably isoprene, myrcene or 2-methyl-1,3-pentadiene, and most preferably isoprene.

The hydrocarbyl group or groups in the formula (3) may or may not be the same as those in formula (4). These hydrocarbyl groups are the same as those described above in conjunction with the discussion of the hydrocarbyl groups of formulae (1) and (2). Suitable monomers for the B block are 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene or mixtures thereof, preferably 1,3-butadiene, 1,3-pentadiene or 1,3-hexadiene, and most preferably it is 1,3-butadiene. It is preferred that each of the B blocks is polymerized from a single monomer.

The block copolymer of this embodiment is terminated at both ends with a block I.

The scope of this embodiment and of any other embodiments of the invention wherein the block B is used also emcompasses polymers wherein the central block B may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl napthalene or alkylated vinyl naphthalene), incorporated for control of glass transition temperature (Tg), density, solubility parameters and refractive index. Suitable aryl-substituted olefins are those described below in conjunction with the second embodiment of the invention. Similarly, the scope of this embodiment also emcompasses polymers wherein the central block B may be comprised of copolymers of one or more conjugated diene of formula (3) and any other anionically polymerizable monomer capable of polymerizing with the conjugated diene of formula (3).

It will be apparent to those skilled in the art that proper choice of polymerization parameters can produce polymers with a great variety of compositional and structural differences, falling within the scope of our invention. Changes in composition of the central block B control the nature of the rubbery properties while changes in the terminal blocks permit response to different vulcanizing agents, e.g., sulfur-based cure systems and phenolic resin cure systems.

The block copolymer is polymerized by any conventional block copolymerization process, such as anionic polymerization, discussed in detail below. As will be apparent to those skilled in the art, the copolymer of this embodiment contains at least three alternating blocks. I-B-I, referred to herein as the triblocks or triblock units, but it may contain an unlimited number of blocks, so long as the entire block copolymer is terminated at both ends by the I blocks. It is, however, preferred that the copolymer of this embodiment contain only one triblock I-B-I. Polymers having more than three blocks (such as five) allow crosslinking to take place at the ends and in the central portion, but maintain a controlled large distance between crosslinks of the polymer. It is important to have the block copolymer terminated at each end with the I blocks to assure that there are unsaturated groups at each end of the block copolymer enabling the block copolymer to be crosslinked or functionalized at the terminal ends thereof. The term "functionalized" is used herein to describe chemical modifications of the unsaturated groups to produce functional groups, the nature of which is described in detail below. The crosslinking of the functionalized and nonfunctionalized copolymer chains is conducted in a conventional manner and is described below.

After the block copolymer is polymerized, it is subjected to a selective hydrogenation reaction during which the B blocks of the block copolymer are selectively hydrogenated to such an extent that they contain substantially none of the original unsaturation, while the I blocks retain a sufficient amount of their original unsaturation to cure the block copolymer. Generally, for a block copolymer wherein the I and B blocks are polymerized from any of the monomers discussed above, the Iodine Number for the I blocks after the selective hydrogenation reaction is about 10 to about 100%, preferably about 25 to about 100%, more preferably about 50 to about 100%, and most preferably about 100% of the Iodine Number prior to the selective hydrogenation reaction, and for the B blocks it is about 0 to about 10%, preferably about 0 to about 0.5%, of the Iodine Number prior to the selective hydrogenation reaction. The Iodine Number, as is known to those skilled in the art, is defined as the theoretical number of grams of iodine which will add to the unsaturation in 100 grams of olefin and is a quantitative measurement of unsaturation.

In this embodiment of the invention, although the microstructure of the I blocks is not critical and may consist of any combination of 1,2-, 3,4- and 1,4-units, schematically represented below for the polyisoprene blocks, when a polar compound is used during the polymerization of the I block, the I blocks comprise primarily (at least about 80%) 3,4-units, the remainder being primarily (about 20%) 1,2-units; when the polar compound is not used during the polymerization of the I block, the I blocks comprise primarily (about 80%) 1,4-units, the remainder being primarily 1,2- and 3,4-units.

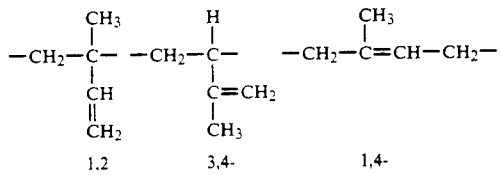

As discussed above, when the predominant monomer used to polymerize the B blocks is 1,3-butadiene, the microstructure of the B blocks should be a mixture of 1,4- and 1,2-units schematically shown below for the polybutadiene blocks:

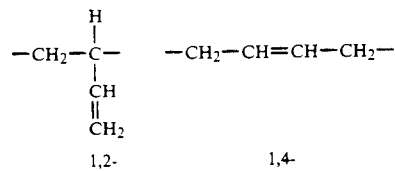

since the hydrogenation of the predominantly 1,4-microstructures produces a crystalline polyethylene segment. The microstructure of the I and B blocks (as well as of the polymerized conjugated dienes of formulae (1) or (3) in any polymers of this invention) is controlled in a conventional manner, e.g., by controlling the amount and nature of the polar compounds used during the polymerization reaction, and the reaction temperature. In one particularly preferred embodiment, the polybutadiene block contains about 55% of the 1,2-and about 45% wt. of the 1,4-microstructure. If the B block is polybutadiene, the hydrogenation of the B block containing about 50 to about 60% wt. of the 1,2-microstructure content produces an elastomeric center block which is substantially an ethylene-butene-1 copolymer having substantially no crystallinity. The reduction of the 1,2-content microstructure in the polybutadiene block in a controlled manner permits the introduction of controlled levels of crystallinity into the hydrogenated polybutadiene block which provides a "green" (unvulcanized) strength necessary in certain applications. If the B block is polymerized from 1,3-pentadiene, it is preferred that it have predominantly (at least 50%) 1,4-microstructure, which, after hydrogenation, produces a substantially non-crystalline elastomeric block.

The terms 1,2-, 1,4-, and 3,4-microstructure or units as used in this application refer to the products of polymerization obtained, respectively, by the 1,2-, 1,4- and 3,4-, additions of monomer units into the growing polymer chain.

We surprisingly discovered that the polymerized conjugated dienes of formula (3), e.g., the B blocks, of the polymers of this invention are selectively hydrogenated in our hydrogenation process much faster than the polymerized conjugated dienes of formula (1), e.g., the I blocks. This is not evident from the teachings of Falk, discussed above, because Falk teaches that double bonds of the disubstituted 1,4-polybutadiene units are hydrogenated selectively in the presence of double bonds of the trisubstituted 1,4-polyisoprene units (which are not hydrogenated). We suprisingly discovered that the disubstituted double bonds of the 1,4-polybutadiene units are hydrogenated along with the monosubstituted double bonds of the 1,2-polybutadiene units, while the disubstituted double bonds of the 3,4-polyisoprene units are hydrogenated at a much slower rate than the aforementioned butadienes. Thus, in view of Falk's disclosure it is suprising that the disubstituted double bonds of the 1,4-polybutadiene units are hydrogenated selectively in the presence of the disubstituted double bonds of the 3,4-polyisoprene units. This is also surprising in view of the teachings of Hoxmeier, Published European Patent Application, Publication No. 0 315 280, who discloses that the disubstituted double bonds of the 1,4-polybutadiene units, monosubstituted double bonds of the 1,2-polybutadiene units and disubstituted double bonds of the 3,4-polyisoprene units are hydrogentated simultaneously at substantially the same rates. For example, for the block copolymers of this invention, wherein the I block is polyisoprene and the B block is polybutadiene, Fourier transform infrared (FTIR) analysis of selectively hydrogenated triblock polymers indicates that the hydrogenation of the double bonds of the 1,2-polybutadiene units proceeds most rapidly, followed by the hydrogenation of the double bonds of the 1,4-polybutadiene units. Infrared absorptions caused by these groups disappear prior to appreciable hydrogenation of the polyisoprene units.

After the I-B-I block copolymer is prepared, it is subjected to a selective hydrogenation reaction to hydrogenate primarily only the middle B unit of each of the triblocks. The selective hydrogenation reaction and the catalyst are described in detail below. After the hydrogenation reaction is completed, the selective hydrogenation catalyst is removed from the block copolymer, and the polymer is isolated by conventional procedures, e.g., alcohol flocculation, steam stripping of solvent or non-aqueous solvent evaporation. An antioxidant, e.g., Irganox 1076 (from Ciba-Geigy), is normally added to the polymer solution prior to polymer isolation.

The isolated polymer is vulcanizable through the unsaturated end blocks I by a number of well known processes utilized currently for thermosetting hydrocarbon elastomers. Such processes are detailed in RUBBER TECHNOLOGY, THIRD EDITION, VAN NOSTRAND REINHOLD COMPANY, New York, 1987, Maurice Morton, Editor, chapters 2, 9 and 10, incorporated herein by reference *Triblock Copolymer of at Least One Poly-Diene Center Block and Terminal Blocks of Aryl-Substituted Olefin/Diene Copolymer*

In this alternative embodiment of the invention, the block copolymer comprises at least one triblock of:

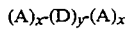

$(A)_x\text{-}(D)_y\text{-}(A)_x$ wherein the block A is a copolymer of at least one aryl-substituted olefin and at least one conjugated diene of formula (1), defined above. The block is either a random or a block copolymer. When the block A has molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the block A has molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the block A has molecular weight of about 350 to about 7,500, x represents the total number of monomer units in the block A, such that the block copolymer comprises about 0.25 to about 10%, preferably about 2 to about 10% wt. of the A blocks, and y represents the total number of monomer units in the block D, such that the block copolymer comprises about 80 to about 99.5%, preferably about 80 to about 96% wt. of the D blocks. When the block A has molecular weight of about 7,500 to about 20,000, the block copolymer comprises about 0.25 to about 25%, preferably about 10 to about 20% wt. of the A blocks and about 50 to about 99.5%, preferably about 60 to about 80% wt. of the D blocks. The most preferred conjugated diene of formula (1) is isoprene. In this block copolymer, D is a block of a polymer of at least one conjugated diene of formula (3), discussed above, which is different from the conjugated diene of formula (1). The block copolymer of this embodiment may contain several, e.g., 5–7, blocks of the aforementioned formula so long as it is terminated at both ends with the block A, but, preferably, it contains only three blocks A-D-A. Suitable aryl-substituted olefins used to polymerize the A block have the formula

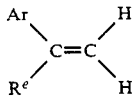

where Ar is phenyl, alkyl-substituted phenyl, naphthyl or alkyl-substituted naphthyl, $R^e$ is hydrogen, methyl, ethyl, propyl, butyl or aryl. Examples of suitable aryl-substituted olefins are styrene, 2-phenyl alpha-olefins, such as alpha-methyl styrene, 1,1-diphenyl ethylene, alkylated styrenes, vinyl naphthalene, or any alkylated vinyl naphthalenes. Suitable alkyl substituents in the alkylated styrenes or alkylated vinyl naphthalenes are methyl, ethyl, propyl, tert-butyl and sec-butyl. Each of the alkylated styrenes or vinyl naphthalenes may contain one or more alkyl substituents. Preferred aryl-substituted olefins are styrene, vinylnaphthalene, alphamethyl styrene, vinyltoluene and diphenylethylene. The microstructure of the polymerized diene of formula (1) is not critical, but can be controlled in the manner discussed above. In the most preferred embodiment, the A block of this triblock copolymer is polymerized from isoprene and styrene in the molar proportion of about 1:10. The block copolymer is polymerized by any conventional block copolymerization process, such as anionic polymerization, discussed in detail below.

Regardless of the molecular weight of the block A, the scope of this embodiment, and of any other embodiment of the invention wherein the block A is used, also encompasses polymers wherein the blocks A are prepared by, initially, polymerizing at least one aryl-substituted olefin alone, and subsequently reacting the resulting poly-aryl-substituted olefin with any compounds which, after chemical reaction with the poly-aryl-substituted olefin, will provide the residual double bonds to the A blocks, as defined above in conjunction with the discussion of the conjugated diene of formula (1). The resulting block A will therefore have substantially the same residual unsaturation (residual double bonds) on the terminal blocks A as any other block A made in accordance with this embodiment (or any other embodiment which uses the block A), i.e., by copolymerizing the aryl-substituted olefin with at least one conjugated diene of formula (1).

The block copolymer of this embodiment is terminated at both ends with a block A.

The scope of this embodiment, and of any other embodiments of the invention wherein the block D is used, also encompasses polymers wherein the central (middle) block D may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index.

Most preferably, in this embodiment of the invention, the block A of the copolymer has molecular weight of about 7,500 to about 20,000, the A block is polymerized from isoprene and styrene, and the D block from 1,3-butadiene, in such proportions that the final copolymer comprises about 1 to about 2% wt. of the isoprene, about 25 to about 36% wt. of the styrene, and about 62 to about 74% wt. of the butadiene units.

After the polymerization is completed, the block copolymer is subjected to a selective hydrogenation reaction. After selective hydrogenation, the polymer contains a sufficient amount of its original unsaturation in the terminal blocks A to cure the block copolymer, thereby permitting chemical crosslinking or functionalization in the manner discussed below, while the middle block D contains substantially none of the original unsaturation. For example, for a block copolymer wherein the A blocks are copolymers of styrene and isoprene and the D block is polybutadiene, the Iodine Number before selective hydrogenation for each of the A blocks is 5-150 and for the D block it is 250-470. After selective hydrogenation, the Iodine Number for each of the A blocks is about 5 to about 150 and for the D block it is about 0 to about 10, preferably about 0 to about 2.5, and most preferably 0. Generally, for a block copolymer wherein the A and D blocks are polymerized from any of the monomers suitable for their polymerization, discussed above, the Iodine Number for the A blocks after the selective hydrogenation is completed is about 10 to about 100%, preferably about 100% of the Iodine Number prior to the selective hydrogenation reaction, and for the D blocks it is about 0 to about 10%, preferably about 0 to about 0.5%, and most preferably 0% of the Iodine Number prior to the selective hydrogenation reaction. Thus, in this embodiment, the block D is also selectively hydrogenated in the same manner as discussed above for the central block B of the first embodiment of the invention.

The block copolymer of this embodiment is also a solid, and, after selective hydrogenation, the unsaturated groups in the terminal A blocks of each of the triblocks provide a means of crosslinking the copolymer or functionalizing the terminal blocks A, in the manner discussed elsewhere in this application.

The preferred polymers of this embodiment, wherein the A blocks have molecular weights of about 7,500 to about 20,000, while possessing the superior elastomeric properties of the thermoplastic elastomer triblocks in the uncured state, can be chemically crosslinked to render them insoluble in most organic solvents and enable them to retain elastomeric properties at very high temperatures. This elastomer is distinct from KRATON since KRATON has no unsaturated groups in the terminal styrene blocks and therefore cannot be chemically cross-linked through these blocks.

Triblock Copolymer of at Least One Poly-Diene Center Block, and at Least One Terminal Block of Aryl-Substituted Olefin/Diene Copolymer In this embodiment of the invention, the block copolymer comprises at least one triblock of:

I-D-A where the block I is a polymer of at least one polymerized diene of formula (1), defined above, the block D is a polymer of at least one conjugated diene of formula (3), defined above, which is different from the conjugated diene of formula (1), and the block A is a copolymer of at least one aryl-substituted olefin and at least one conjugated diene of formula (1), both defined above. The block A has molecular weight of about 350 to about 7,500 and it comprises about 50 to about 65%, preferably about 50% by mole of the aryl-substituted olefin, and about 35 to about 50, preferably about 50% by mole of the conjugated diene of formula (1). This block copolymer comprises about 0.1 to about 50, preferably about 1 to about 5% wt. of the sum of blocks I and A, and about 50 to about 99.9, preferably about 95 to about 99% wt. of the block D. The block copolymer of this embodiment may also contain several, e.g. 5-7, blocks of the aforementioned formulae so long as it is terminated at both ends thereof with blocks I or A. The block copolymer is polymerized by any conventional block copolymerization process, such as anionic polymerization, discussed in detail below.

The scope of this embodiment of the invention also encompasses polymers wherein the central block D may be comprised of copolymers of one or more conjugated diene of formula (3) and controlled amounts (about 0.1 to about 30 mole %) of an aryl-substituted olefin, e.g., styrene or other suitable monomers (such as alkylated styrene, vinyl naphthalene or alkylated vinyl naphthalene), incorporated for control of glass transition temperature (Tg), density, solubility parameters and refractive index. Suitable aryl-substituted olefins are those described above. Similarly, the scope of this embodiment also encompasses polymers wherein the central block D may be comprised of copolymers of one or more conjugated diene of formula (3) and any other anionically polymerizable monomer capable of polymerizing with the conjugated diene of formula (3). This embodiment also encompasses polymers wherein the blocks A are prepared by, initially, polymerizing at least one aryl-substituted olefin alone and, subsequently, reacting the resulting poly-aryl-substituted olefin with any compounds which, after chemical reaction with the poly-aryl-substituted olefin, will provide the residual double bonds to the A blocks, as defined above in conjunction with the discussion of the conjugated diene of formula (1). The resulting block A will therefore have substantially the same residual unsaturation (residual double bonds) on the terminal blocks A as any other block A made in accordance with this embodiment.

After the polymerization is completed the block copolymer is subjected to a selective hydrogenation reaction. After selective hydrogenation, the polymer contains a sufficient amount of its original unsaturation in the terminal blocks I and A to cure the block copolymer, thereby permitting chemical crosslinking or functionalization in the manner discussed below, while the middle block D contains substantially none of the original unsaturation. Generally, for a block copolymer wherein the I, D and A blocks are polymerized from any of the monomers suitable for their polymerization, as defined above, the Iodine Number for the I and A blocks after the selective hydrogenation is completed is about 10 to about 100%, preferably about 100% of the Iodine Number prior to the selective hydrogenation reaction, and for the D blocks it is about 0 to about 10%, preferably about 0 to about 0.5%, and most preferably 0% of the Iodine Number prior to the selective hydrogenation reaction. Thus, in this embodiment, the block D is also selectively hydrogenated in the same manner as discussed above, while the terminal blocks I and A retain a substantial amount of their original unsaturation.

The block copolymer of this embodiment is also a solid, and, after selective hydrogenation, the unsaturated groups in the terminal I and A blocks of each of the triblocks provide a means of crosslinking the copolymer or functionalizing the terminal blocks I and A, in the manner discussed elsewhere in this application.

Random Copolymers

Random copolymers of this invention have controlled amounts of unsaturation incorporated randomly in an otherwise saturated backbone. In contrast to EPDM, the level of unsaturation can be inexpensively and easily controlled, e.g., to produce polymers having Iodine Number of about 5 to about 100, to provide a wide variation in vulcanization rate and potential cocurability with various highly unsaturated rubbers based on butadiene or isoprene.

In one embodiment, the random copolymers are polymerized from the same monomers used to polymerize the block copolymers $(I)_x$-$(B)_y$-$(I)_x$, i.e., from at least one conjugated diene of formula (1) and at least one conjugated diene of formula (3), both defined above, providing that the diene of formula (1) is different from the diene of formula (3). This random copolymer contains about 1.0 to about 25%, preferably about 1.0 to about 10% by mole of the polymerized conjugated diene of formula (1) and about 75 to about 99%, preferably about 90 to about 99% by mole of the polymerized conjugated diene of formula (3). Suitable conjugated dienes of formula (1) are exemplified above. The most preferred conjugated diene of formula (1) for the copolymerization of these random copolymers is isoprene. Suitable conjugated dienes of formula (3) are also exemplified above, 1,3-butadiene is the most preferred conjugated diene of formula (3) for the polymerization of the random copolymer of this embodiment. Thus, most preferably, in this embodiment, the random copolymer is polymerized from isoprene and 1,3-butadiene, and it contains about 1 to about 20% wt. of the isoprene units and about 80 to about 99% wt. of the butadiene units. The isoprene units have primarily (i.e., about 50 to about 90% wt.) the 3,4-microstructure.

In another embodiment, the random copolymers are polymerized from the same monomers used to polymerize the block copolymers $(A)_x$-$(D)_y$-$(A)_x$, i.e., from at least one aryl-substituted olefin, at least one conjugated diene of formula (1), and at least one conjugated diene of formula (3), providing that the conjugated diene of formula (1) is different from the conjugated diene of formula (3) used in the polymerization. The conjugated dienes of formulae (1) and (3) and the aryl-substituted olefins are defined above. This alternative random copolymer contains about 0.3 to about 15% by mole of the aryl-substituted olefin, about 1.0 to about 25%, preferably about 1.0 to about 10%, by mole of the conjugated diene of formula (1), the remainder being the conjugated diene of formula (3).

The random copolymers are then subjected to the selective hydrogenation reaction discussed above for the block copolymers, during which polymerized conjugated diene units of formula (3) are substantially completely hydrogenated, while the polymerized conjugated diene units of formula (1) are hydrogenated to a substantially lesser extent, i.e., to such an extent that they retain a sufficient amount of their original unsaturation to vulcanize the copolymer, thereby producing solid elastomers having random unsaturation proportional to the unsaturation in the polymerized dienes of formula (1). For example, for a random copolymer polymerized from a diene of formula (1) and a different diene of formula (3), the Iodine Number before selective hydrogenation for the polymer is about 450. After selective hydrogenation, the Iodine Number for the polymer is about 10 to about 100, most of the unsaturation being contributed by the diene of formula (1). Generally, in such random copolymers, the Iodine Number for the polymerized dienes of formula (1) after the selective hydrogenation reaction is about 10 to about 100%, preferably about 25 to about 100%, more preferably about 50 to about 100%, and most preferably about 100% of the Iodine Number prior to the selective hydrogenation reaction, and for the polymerized dienes of formula (3) it is about 0 to about 10%, preferably about 0 to about 0.5% of the Iodine Number prior to the selective hydrogenation reaction. The Iodine Number for the polymerized dienes of formulae (1) and (3) before and after the hydrogenation reactions in these random copolymers can be estimated by any conventional techniques, e.g., by Fourier Transform Infrared (FTIR) analysis, as will be apparent to those skilled in the art.

Similarly, for a random copolymer of aryl-substituted olefins, a conjugated diene of formula (1) and a conjugated diene of formula (3), different from the conjugated diene of formula (1), the Iodine Number before selective hydrogenation for the polymer is about 300 to about 450. After selective hydrogenation, the Iodine Number for the polymer is about 5 to about 100, most of the unsaturation measured by the Iodine Number being contributed by the polymerized diene of formula (1). Generally, for the random copolymer of this embodiment the Iodine Number after the selective hydrogenation reaction for the polymerized diene of formula (1) is about 10 to about 100%, preferably about 100% of the Iodine Number prior to the selective hydrogenation reaction, and for the polymerized diene of formula (3) it is about 0 to about 100%, preferably about 0% of the Iodine Number prior to the selective hydrogenation reaction.

The hydrogenated polymers may be vulcanized. The vulcanized random copolymers of this invention have elastomeric properties similar to those of EPDM. The vulcanization rate of the polymers can be easily and inexpensively increased by increasing the content of the diene of formula (1), i.e., isoprene in the most preferred embodiment, in either embodiment of the random copolymers to from about 5 to about 20% mole.

Star-Branched Polymers

The invention is also directed to star-branched block and random polymers.

The star-branched block polymers are made from any combination of blocks I and B, A and D, or I, D and A, defined above, providing that each free end (i.e., the uncoupled end) of the star-branched polymer is either an I or an A block in the star-branched block polymers made from blocks I and B, A and D or I, D and A. The star-branched I-B block copolymers comprise about 0.1 to about 50%, preferably about 1 to about 5% by wt. of the I blocks and about 50 to about 99.9% by wt. of the B blocks. The star-branched A-D block copolymers, similarly to the A-D-A block copolymers, may have the A blocks of a low molecular weight (about 350 to about 7,500) or of a high molecular weight (about 7,500 to about 20,000). When the block A has molecular weight of about 350 to about 7,500, it comprises about 50 to about 65%, preferably about 50% by mole of the aryl-substituted olefin, and about 35% to about 50%, preferably about 50% by mole of the conjugated diene of formula (1). When the block A has molecular weight of about 7,500 to about 20,000, it comprises about 1 to about 99%, preferably about 80 to about 98% by mole of the aryl-substituted olefin, and about 99 to about 1%, preferably about 2 to about 20% by mole of the conjugated diene of formula (1). When the block A has molecular weight of about 350 to about 7,500, the A-D star-branched block copolymer comprises about 0.25 to about 10%, preferably about 2 to about 10% wt. of the A blocks, and about 80 to about 99.5%, preferably about 80 to about 96% wt. of the D blocks. When the block A has molecular weight of about 7,500 to about 20,000, the A-D star-branched block copolymer comprises about 0.25 to about 25%, preferably about 10 to about 20% wt. of the A blocks and about 50 to about 99.5%, preferably about 60 to about 80% wt. of the D blocks. In the star-branched I-D-A block copolymers, the block A has molecular weight of about 350 to about 7,500. The star-branched I-D-A block copolymers comprise about 0.1 to about 50%, preferably about 1 to about 5% wt. of the sum of blocks I and A, and about 50 to about 99.9%, preferably about 95 to about 99% wt. of the blocks D.

The star-branched block polymers are selectively hydrogenated in the selective hydrogenation process to such an extent that blocks B or D contain substantially none of the original unsaturation, while each of the blocks I and A, respectively, retains a sufficient amount of the original unsaturation of the conjugated dienes present in these blocks to cure the star-branched block polymers. Thus, for the I-B star-branched block polymer, after the selective hydrogenation reaction, the Iodine Number for the I blocks is about 10 to about 100%, preferably about 25 to about 100%, more preferably about 50 to about 100%, and most preferably about 100% of their Iodine Number prior to the selective hydrogenation reaction, and for the B blocks it is about 0 to about 10%, preferably about 0 to about 0.5% of the Iodine Number prior to the selective hydrogenation reaction. For the A-D star-branched block polymer, after the selective hydrogenation reaction, the Iodine Number for the A blocks is about 10 to about 100%, preferably about 25 to about 100%, more preferably about 50 to about 100%, and most preferably about 100% of the Iodine Number prior to the selective hydrogenation reaction, and for the D blocks it is about 0 to about 10%, preferably about 0 to about 0.5% of the Iodine Number prior to the selective hydrogenation reaction. Similarly, for the I-D-A star-branched block polymer, the Iodine Number for each of the I and A blocks after the selective hydrogenation is completed is about 10 to about 100%, preferably about 100% of the Iodine Number prior to the selective hydrogenation reaction, and for the D blocks it is about 0 to about 10%, preferably about 0 to about 0.5%, and most preferably 0% of the Iodine Number prior to the selective hydrogenation reaction. Thus, in this embodiment, the block D is also selectively hydrogenated in the same manner as discussed above for the central blocks B and D of the other embodiments of the invention.

The star-branched random copolymers are made from any combination of at least one diene of formula (1) and at least one diene of formula (3), or from any combination of at least one aryl-substituted olefin, at least one diene of formula (1) and at least one diene of formula (3), all of which are the same as those discussed above in conjunction with the block and random copolymers. The star-branched random copolymers of the dienes of formulae (1) and (3), which must be different from each other, comprise about 1 to about 25%, preferably about 1 to about 10% by mole of the polymerized conjugated diene of formula (1) and about 75 to about 99%, preferably about 90 to about 99% by mole of the polymerized conjugated diene of formula (3). The star-branched random copolymers of the aryl-substituted olefin, at least one diene of formula (1) and at least one diene of formula (3), different from the diene of formula (1), comprise about 0.3 to about 15% by mole of the aryl-substituted olefin, about 1 to about 25%, preferably about 1 to about 10% by mole of the conjugated diene of formula (1), and the remainder of the conjugated diene of formula (3). The star-branched random copolymers are also selectively hydrogenated in the selective hydrogenation process to such an extent that the polymerized dienes of formula (3) contain substantially none of the original unsaturation, while the polymerized dienes of formula (1) retain a sufficient amount of the original unsaturation to cure the star-branched random copolymers. Thus, for the star-branched random polymer of the conjugated diene of formula (1) and a different diene of formula (3), both identified above, the Iodine Number for the polymerized diene of formula (1), after the selective hydrogenation reaction, is about 10 to about 100%, preferably about 25 to about 100%, more preferably about 50 to about 100%, and most preferably about 100% of the Iodine Number prior to the selective hydrogenation reaction, and for the polymerized diene of formula (3) it is about 0 to about 10%, preferably about 0 to about 0.5% of the Iodine Number prior to the selective hydrogenation reaction. Similarly, for the star-branched random polymers made from at least one aryl-substituted oelfin, at least one diene of formula (1) and at least one diene of formula (3), the Iodine Number for the polymerized diene of formula (1), after the selective hydrogenation reaction, is about 10 to about 100%, preferably about 25 to about 100%, more preferably about 50 to about 100%, and most preferably about 100% of the Iodine Number prior to the selective hydrogenation reaction, and for the polymerized diene of formula (3) it is about 0 to about 10%, preferably about 0 to about 0.5% of the Iodine Number prior to the selective hydrogenation reaction.

Blends Of Inventive Polymers With Other Materials

The block or random copolymers of this invention can, of course, be blended with any rubbers, in which case the degree of unsaturation of the copolymers of the invention can be adjusted so that the vulcanization rate of the two materials is substantially the same. Suitable rubbers which can be blended with the copolymers of this invention are EPDM, butyl rubber and rubbers based on butadiene or isoprene.

The block and random copolymers of this invention can also be blended with plastics, e.g., isotactic polypropylene, polystyrene, polyethylene, Nylon, polycarbonates, polyesters and styrene-acrylonitrile resins. Thermoplastic elastomers having excellent properties can be obtained by dynamically vulcanizing a blend of polypropylene and the elastomers of our invention, in which the elastomers are crosslinked to a very high degree. A commercial material, Santoprene (trademark of and produced by Monsanto Chemical Co.) is based upon blends of polypropylene and EPDM. Details of the preparation and properties of such blends are presented in THERMOPLASTIC ELASTOMERS, A COMPREHENSIVE REVIEW, edited by N. R. Legge et al., Chapter 7, Hanser Publishers, Munich, Vienna and New York (1987), the contents of which are incorporated herein by reference. Such dynamically vulcanized blends prepared with the polymers of the invention in a conventional manner, e.g., that of N. R. Legge et al., wherein the polymers of this invention are blended with polypropylene, and most particularly wherein the triblock polymers of this invention are blended with polypropylene, can provide thermoplastic elastomers with unique elastomeric properties.

The block and random copolymers of this invention can, of course be compounded with ingredients known to those skilled in the art, e.g., fillers, such as silica, carbon block, extender oils, antioxidants, tackifying agents, vulcanizing agents and similar materials.

Polymerization Reaction

The block copolymers of this invention are polymerized by any known block polymerization processes, preferably by an anionic polymerization process. Anionic polymerization is well known in the art, and it is utilized in the production of a variety of commercial polymers. An excellent comprehensive review of the anionic polymerization processes appears in the text ADVANCES IN POLYMER SCIENCE 56, ANIONIC POLYMERIZATION, pp. 1-90, Springer-Verlag, Berlin, Heideberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyl-lithium, sec-butyl-lithium, t-butyl-lithium, sodium naphthalide or cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as hexane, cyclohexane or heptane, or aromatic solvents, such as benzene or toluene. In certain instances, inert polar solvents, such as tetrahydrofuran, can be used alone as a solvent, or in a mixture with a hydrocarbon solvent.

The block polymerization process will be exemplified below for the polymerization of the first embodiment of the invention, and specifically for the preferred embodiment thereof, i.e., a triblock of polyisoprene-polybutadiene-polyisoprene. However, it will be apparent to those skilled in the art that the same process principles can be used for the polymerization of all copolymers of the invention.

The process, when using a lithium-based catalyst, comprises forming a solution of the isoprene monomer in an inert hydrocarbon solvent, such as cyclohexane, modified by the presence therein of one or more polar compounds selected from the group consisting of ethers, thioethers and tertiary amines e.g., tetrahydrofuran. The polar compounds are necessary to control the microstructure of the butadiene center block, i.e., the content of the 1,2-structure thereof. The higher the content of the polar compounds, the higher will be the content of the 1,2-structure in these blocks. Since the presence of the polar compound is not essential in the formation of the first polymer block with many initiators unless a high 3,4-structure content of the first block is desired, it is not necessary to introduce the polar compound at this stage, since it may be introduced just prior to or together with the addition of the butadiene in the second polymerization stage. Examples of polar compounds which may be used are dimethyl ether, diethyl ether, ethyl methyl ether, ethyl propyl ether, dioxane, diphenyl ether, tripropyl amine, tributyl amine, trimethyl amine, triethyl amine, and N-,N-,N'-,N'-tetramethyl ethylene diamine. Mixtures of the polar compounds may also be used. The amount of the polar compound depends on the type of the polar compound and the polymerization conditions as will be apparent to those skilled in the art. The effect of the polar compounds on the polybutadiene microstructure is detailed in ANTKOWIAK et al, TEMPERATURE AND CONCENTRATION EFFECTS ON POLAR-MODIFIED ALKYL LITHIUM POLYMERIZATIONS AND COPOLYMERIZATIONS, JOURNAL OF POLYMER SCIENCE: Part A-1, Vol. 10, 1319-1334 (1972), incorporated herein by reference. The polar compounds also accelerate the rate of polymerization. If monomers other than butadiene, e.g., pentadiene, are used to polymerize the central blocks B or C, polar compounds are not necessary to control the microstructure because such monomers will inherently produce polymers which do not possess crystallinity after hydrogenation.

When the alkyl lithium-based initiator, a polar compound and an isoprene monomer are combined in an inert solvent, polymerization of the isoprene proceeds to produce the first terminal block whose molecular weight is determined by the ratio of the isoprene to the initiator. The "living" polyisoprenyl anion formed in this first step is utilized as the catalyst for further polymerization. At this time, butadiene monomer is introduced into the system and block polymerization of the second block proceeds, the presence of the polar compound now influencing the desired degree of branching (the 1,2-structure content) in the polybutadiene block. The resulting product is a living diblock polymer having a terminal anion and a lithium counterion. The living diblock polymer serves as a catalyst for the growth of the final isoprene block, formed when isoprene monomer is again added to the reaction vessel to produce the final polymer block, resulting in the formation of the I-B-I triblock. Upon completion of polymerization, the living anion, now present at the terminus of the triblock, is destroyed by the addition of a proton donor, such as methyl alcohol or acetic acid. The polymerization reaction is usually conducted at a temperature of between 0° C. and about 100° C., although higher temperatures can be used. Control of a chosen reaction temperature is desirable since it can influence the effectiveness of the polar compound additive in controlling the polymer microstructure. The reaction temperature can be, for example, from 50° to 80° C. The reaction pressure is not critical and varies from atmospheric to about 100 psig. If the polar compounds are utilized prior to the polymerization of the first I segment, I blocks with high 3,4-unit content are formed. If polar compounds (some of which can be Lewis bases) are added after the initial I segment is prepared, the first I segment will possess a high percentage of 1,4-microstructure (which is trisubstituted), and the second I segment will have a high percentage of 3,4-microstructure.

The production of triblock polymers having a high 1,4-unit content on both of the terminal I blocks is also possible by the use of coupling techniques illustrated below for a polyisoprene-polybutadiene-polyisoprene block copolymer:

pared to a sequential addition of isoprene, followed by butadiene, followed by isoprene. Such coupling techniques are well known and utilize coupling agents, such as esters, $CO_2$, iodine, dihaloalkanes, silicon tetrachloride, divinyl benzene, alkyl trichlorosilanes and dialkyl dichlorosilanes. The use of tri- or tetra-functional coupling agents, such as alkyl trichlorosilanes or silicon tetrachloride, permits the formation of macromolecules having 1- or 2-main chain branches, respectively. The addition of divinyl benzene as a coupling agent has been documented to produce molecules having up to 20 or more separately joined segments.

The use of some of the coupling agents provides a convenient means of producing star-branched block and random polymers. The star-branched block polymers are made from any combination of blocks I and B, A and D or I, D and A, discussed above, providing that each free end (i.e., uncoupled end) of the star-branched polymer is either an I or an A block, respectively. The star-branched random polymers are made from any combination of at least one diene of formula (1) and at least one diene of formula (3), different from the diene of formula (1), or from at least one aryl-substituted olefin, at least one diene of formula (1) and at least one diene of formula (3), different from the diene of formula (1). The molecular weight of the star-branched block and random copolymers will depend on the number of branches in each such copolymer, as will be apparent to those skilled in the art. Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and Great Britain patents 1,014,999; 1,074,276; 1,121,978.

The random copolymers of the invention are polymerized and/or coupled in a similar fashion, but all monomers, e.g., isoprene and butadiene, are mixed in a proper ratio prior to the reaction with the polar compound-modified alkyl-lithium. In the random polymer preparation, of course, only one stage is necessary.

Selective Hydrogenation

The selective hydrogenation reaction will also be described below using a triblock of polyisoprene-polybutadiene-polyisoprene as an example. However, it will be apparent to those skilled in the art that any

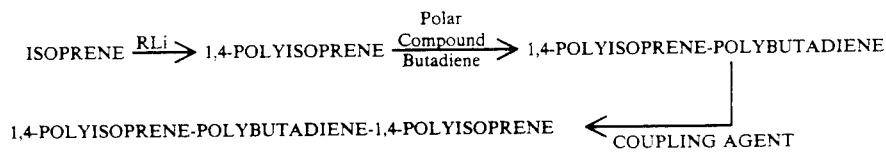

The substitution of myrcene for the isoprene during the polymerization of the I block insures the incorporation of a high proportion of trisubstituted double bonds, even in the presence of polar compounds since myrcene contains a pendant trisubstituted double bond which is not involved in the polymerization process. In a coupling process similar to that described above, block polymers containing polyisoprene end blocks (or any other polymerized monomer suitable for use in the I block) having a high 3,4-microstructure content can be obtained by adding the polar compound prior to the isoprene (or another monomer) polymerization.

The use of the coupling technique for the production of triblock polymers greatly reduces the reaction time necessary for the completion of polymerization, as compared polymers of this invention can be selectively hydrogenated in the same manner.

The block copolymer is selectively hydrogenated to saturate the middle (polybutadiene) block of each of the triblocks. The method of selectively hydrogenating the polybutadiene block is similar to that of Falk, "Coordination Catalysts For The Selective Hydrogenation of Polymeric Unsaturation", JOURNAL OF POLYMER SCIENCE: PART A-1, Volume 9, 2617-2623 (1971), but it is conducted with the novel hydrogenation catalyst and process used herein. Any other known selective hydrogenation methods may also be used, as will be apparent to those skilled in the art, but it is preferred to use the method described herein. In summary, the selective hydrogenation method preferably used herein comprises contacting the previously-prepared block copolymer with hydrogen in the presence of the novel catalyst composition.

The novel hydrogenation catalyst composition and hydrogenation process are described in detail in previously cited Application Ser. No. 07/466,136. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred transition metal compounds are metal carboxylates or alkoxides of Group IVb or VIII of the Periodic Table of the Elements, such as nickel (II) 2-ethylhexanoate, titanium isopropoxide, cobalt (II) octoate, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyllithium, diethylzinc, di-n-propylzinc, triethylboron, diethylaluminumethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is a trialkylaluminum compound having 1 to about 6 carbon atoms per alkyl radical. Other reducing agents which can be used herein are disclosed in Stevens et al, U.S. Pat. No. 3,787,384, column 4, line 45 to column 5, line 12 and in Strobel et al, U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl lithium, sec-butyl lithium, n-hexyl lithium, phenyl-lithium, triethylaluminum, tri-isobutylaluminum, trimethylaluminum, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optima ratios will vary depending upon the transition metal and the organometallic agent used, e.g., for the trialkylalumium/nickel (II) systems the preferred aluminum: nickel molar ratio is about 2.5:1 to about 4:1, for the trialkylaluminum/cobalt(II) systems the preferred aluminum: cobalt molar ratio is about 3:1 to about 4:1 and for the trialkylaluminum/titanium(IV) alkoxides systems, the preferred aluminum: titanium molar ratio is about 3:1 to about 6:1.

The mode of addition and the ratio of the reducing agent to the transition metal compound are important in the production of the novel hydrogenation catalyst having superior selectivity, efficiency and stability as compared to prior art catalytic systems. During the synthesis of the hydrogenation catalysts it is preferred to maintain the molar ratio of the reactants used to synthesize the catalyst substantially constant. This can be done either by the addition of the reducing agent as rapidly as possible to a solution of the transition metal compound, or by a substantially simultaneous addition of the separate streams of the reducing agent and the transition metal compound to a catalyst synthesis vessel in such a manner that the selected molar ratios of the metal of the reducing agent to the metal of the transition metal compound are maintained substantially constant throughout substantially the entire time of addition of the two compounds. The time required for the addition must be such that excessive pressure and heat build-up are avoided, i.e., the temperature should not exceed about 80° C. and the pressure should not exceed the safe pressure limit of the catalyst synthesis vessel.

In a preferred embodiment, the reducing agent and the transition metal compound are added substantially simultaneously to the catalyst synthesis vessel in such a manner that the selected molar ratio of the reducing agent to the transition metal compound is maintained substantially constant during substantially the entire time of the addition of the two compounds. This preferred embodiment permits the control of the exothermic reaction so that the heat build-up is not excessive, and the rate of gas production during the catalyst synthesis is also not excessive-accordingly the gas build-up is relatively slow. In this embodiment, carried out with or without solvent diluent, the rate of addition of the catalyst components is adjusted to maintain the synthesis reaction temperature at or below about 80° C., which promotes the formation of the selective hydrogenation catalyst. Furthermore, the selected molar ratios of the metal of the reducing agent to the metal of the transition metal compound are maintained substantially constant throughout the entire duration of the catalyst preparation when the simultaneous mixing technique of this embodiment is employed.

In another embodiment, the catalyst is formed by the addition of the reducing agent to the transition metal compound. In this embodiment, the timing and the order of addition of the two reactants is important to obtain the hydrogenation catalyst having superior selectivity, efficiency and stability. Thus, in this embodiment, it is important to add the reducing agent to the transition metal compound in that order in as short a time period as practically possible. In this embodiment, the time allotted for the addition of the reducing agent to the transition metal compound is critical for the production of the catalyst. The term "as short a time period as practically possible" means that the time of addition is as rapid as possible, such that the reaction temperature is not higher than about 80° and the reaction pressure does not exceed the safe pressure limit of the catalyst synthesis vessel. As will be apparent to those skilled in the art, that time will vary for each synthesis and will depend on such factors as the types of the reducing agents, the transition metal compounds and the solvent used in the synthesis, as well as the relative amounts thereof, and the type of the catalyst synthesis vessel used. For purposes of illustration, a solution of about 15 ml of triethylaluminum in hexane should be added to a solution of nickel(II) octoate in mineral spirits in about 10-30 seconds. Generally, the addition of the reducing agent to the transition metal compound should be carried out in about 5 seconds (sec) to about 5 minutes, depending on the quantities of the reagents used. If the time period during which the reducing agent is added to the transition metal compound is prolonged, e.g., more than 15 minutes, the synthesized catalyst is less selective, less stable and may be heterogeneous.

In the embodiment wherein the reducing agent is added as rapidly as possible to the transition metal compound, it is also important to add the reducing agent to the transition metal compound in the aforementioned sequence to obtain the novel catalyst. The reversal of the addition sequence, i.e., the addition of the transition metal compound to the reducing agent, or the respective solutions thereof, is detrimental to the stability, selectivity, activity and homogeneity of the catalyst and is therefore undesirable.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, tolune or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated polymer to be hydrogenated with an amount of the catalyst solution containing about 0.1 to about 0.5, preferably about 0.2 to about 0.3 mole percent of the transition metal based on moles of the polymer unsaturation. The hydrogen partial pressure is about 5 psi to about several hundred psi, but preferably it is about 10 to about 100 psi. The temperature of the hydrogenation reaction mixture is about 25 to about 80° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infra-red spectroscopy, hydrogen flow rate, total hydrogen consumption, or any combination thereof.

After the hydrogenation reaction is completed, the hydrogenation catalyst must be removed from the polymer by any conventional means, for example, in the case of a nickel-based catalyst by contacting the polymer with a complexing agent, such as a high molecular weight diamine (e.g., Jeffamine D-2000 from Texaco), and then with an acid, e.g., sulfuric, phosphoric or hydrochloric acid, in the presence of an oxidizing agent, e.g., air or hydrogen peroxide. The polymer solution is then water-washed and the polymer isolated by conventional methods, e.g., steam or alcohol flocculation or solvent evaporation.

Crosslinking And Functionalization Of The Terminal Blocks

In addition to acting as sites for vulcanization, the unsaturated terminal blocks of the block polymers of this invention can be chemically modified to provide benefits obtained with similar modifications of existing commercial materials, such as butyl rubber or EPDM. In some instances, the benefits obtained by a chemical modification of butyl rubber or EPDM may be magnified using the elastomers of our invention as a matrix instead of the butyl rubber or EPDM because of their intrinsically superior elastomeric properties.

An example of such a chemical modification of the polymers of this invention is sulfonation of the olefinic unsaturation of the I blocks or polymerized dienes of formula (1) of any polymers of this invention containing the I blocks or polymerized dienes of formula (1), followed by neutralization of the thus-formed polymeric sulfonic acid with metal ions or amines. When such a modification is performed on a commercial ethylene-propylene-diene monomer (EPDM) rubber, a thermoplastic elastomer which behaves like a vulcanized rubber at room temperature but can be shaped at higher temperatures is produced. A description of an example of a process for and product description of such a chemically modified EPDM can be found in IONS IN POLYMERS, Advances in Chemistry Series 187, American Chemical Society, Washington, D.C. 1980, pp. 3-53, incorporated herein by reference. Following the procedures used for EPDM described in the aforementioned publication with the triblock of our invention, thermoplastic elastomers with greatly improved elongation properties were prepared.

It is known that the halogenation of the unsaturation in butyl rubber (based upon isoprene monomer) prior to the vulcanization treatment, produces dramatic changes in vulcanization rate and provides greater versatility in the choice of vulcanizing agents. Since the residual unsaturated groups in the first embodiment of our invention, present in the I block, in the most preferred embodiment, may also be based on isoprene monomer, the halogenation of the polymer of this embodiment provides the same benefits, but with the retention of the greater elongation characteristics inherent in the invention polymer. The same benefits will be obtained with any other dienes which can be used to prepare the block I of this embodiment of the invention, and therefore any polymers of this invention containing any such dienes can be halogenated in the same manner as the butyl rubber. Any other polymers of this invention containing the polymerized dienes of formula (1) or blocks I can also be halogenated in the same manner.

It is also known that the reaction of EPDM with maleic anhydride at elevated temperatures (e.g., about 150° C. to about 250° C.) produces maleic modified EPDM which is used commercially as an impact modifier, particularly for Nylon. Similar modification of the polymers of any embodiments of our invention occurs readily, since the residual isoprene unsaturation, primarily of the illustrated 3,4-type, is known to be more reactive with maleic anhydride than are the internal bonds found in EPDM. The resultant impact modifier, because of its greater elongation, provides superior properties when blended with Nylon.

EPDM polymers which have been modified with polar functionality are utilized as dispersant type viscosity index improvers in multigrade lubricants. A great number of patents are devoted to such modifications. Any of the modifications performed on EPDM for this purpose can be performed with the polymers of this invention. Typical modifications which can be used with the polymers of this invention are described in: U.S. Pat. Nos. 3,099,644; 3,257,349; 3,448,174; 3,997,487; 3,870,841; 3,642,728; 3,847,854; 3,437,556; 4,557,849; 4,032,700; 3,899,434; 4,557,847; 4,161,452; 4,170,562; 4,517,104; 4,320,017; 4,502,972; 4,098,710; 4,007,121; 4,011,380; 4,033,888; 4,145,298; 4,402,844; 4,146,489 and British patent 1,072,796, the dislosures of all of which are incorporated herein by reference.

The above examples illustrate only some of the potentially valuable chemical modifications of the polymers of this invention. The high molecular weight block polymers of this invention, providing a means for a wide variety of chemical modifications only at the ends of the molecule (i.e., at the I blocks only), present the opportunity to prepare materials previously impossible because of the lack of availability of such polymers. Some examples of well known chemical reactions which can be performed on polymers of this invention are found in E. M. FETTES, CHEMICAL REACTIONS OF POLYMERS, High Polymers, Vol. 19, John Wiley, New York, 1964, incorporated herein by reference.

Until the instant invention, it has not been possible to produce hydrocarbon elastomers having very large distance between crosslinks (high $M_c$) after vulcanization. Our invention provides block hydrocarbon polymers capable of being vulcanized to a perfect network with a distance between crosslinks substantially equivalent to the dimensions of the unvulcanized elastomeric molecule. In addition to the expected improvements in elastomeric properties, the saturated main chain of the polymers of our invention provides a high degree of oxidative and thermal stability. Unique materials can also be obtained by chemical modifications of the block polymers of this invention, since such modifications can be carried out selectively only at the unsaturated terminal ends of the molecules.

The crosslinking of the selectively hydrogenated block polymers of this invention is conducted in a conventional manner by contacting the block copolymer with a suitable crosslinking agent or a combination of such agents. The crosslinking process produces a copolymer having uniform distance between cross-links.

The block copolymers can also be functionalized by reacting the terminal blocks containing unsaturated groups with various reagents to produce functional groups, such as hydroxyl, epoxy, sulfonic acid, mercapto, acrylate or carboxyl groups. Functionalization methods are well known in the art.

The random copolymers may also be cross-linked or functionalized in the same manner as the block copolymers.

The block and random copolymers, including the star-branched polymers, of this invention can be used in a variety of applications, e.g., to produce electrical insulation, pressure sensitive adhesives, sealants, rubberized asphalts, in automotive applications, e.g., hoses, tubing, weatherstripping, in construction industry, e.g., to produce gaskets, rubber sheeting for roofing, pond and ditch liners, and in many other applications.

The following Examples further illustrate additional features of the invention. However, it will be apparent to those skilled in the art that the specific reactants and reaction conditions used in the Examples do not limit the scope of the invention.

In all of the following examples, the experimental work was performed with dried reactors and equipment and under strictly anaerobic conditions. Extreme care must be used to exclude air, moisture and other impurities capable of interfering with the delicate chemical balance involved in the synthesis of the polymers of this invention, as will be apparent to those skilled in the art.

EXAMPLE 1

Isoprene-Butadiene-Isoprene Triblock Polymer

Two hundred milliliters (ml) of purified dried cyclohexane (99.5% available from Phillips Petroleum Co.) were introduced under nitrogen atmosphere into a two quart glass bowled stirred pressure reactor. The reactor was equipped with an air driven stirrer, a pressure gauge, a thermometer well, a heat exchange coil, a top surface inlet valve, a dip tube feeder with valve, a syringe injection port containing a viton rubber gasket and a blow-out disk (200 psi). Three milliliters (ml) of a 0.01M solution of dipyridyl indicator in cyclohexane and 6.5 ml (70 millimoles-mm) of freshly distilled tetrahydrofuran were injected into the reactor, whose contents were then heated to 54° C. The solution was titrated by slow addition of 0.1 molar butyl lithium (BuLi) until a red color was observed indicating the deactivation of all impurities. Next, 3.0 ml (2 g, 30 mm) of purified isoprene and 20 ml of 0.1 m BuLi solution were injected into the reactor. Oligomerization of the isoprene to form the initial block was completed in approximately one hour. To the solution of living polyisoprenyl anions was added an additional one liter of pre-titrated cyclohexane. To form the second block 100 grams of purified butadiene were slowly pressurized into the reactor at a rate to maintain temperature below 60° C. After an hour, the reactor pressure had dropped to the initial value and the formation of the isoprene-butadiene block copolymer was complete. The diblock living anion was coupled to a triblock having twice the molecular weight of the diblock by the introduction of 11 ml of a 0.1M phenyl benzoate solution (in cyclohexane). The mixture, which contained a 10% stoichiometric excess of the coupling agent, was kept with stirring at 50° C. for an additional thirty minutes and then pressurized from the reactor. A portion of the unhydrogenated triblock polymer was isolated by flocculation in isopropanol containing an antioxidant Irganox 1076 to prevent the crosslinking of the highly unsaturated triblock. The solid polymer sample was filtered and dried in a vacuum oven for 18 hours. Infrared (FTIR) analysis showed the butadiene microstructure to have 50% 1,2- and 50% of 1,4-composition. Gel permeation chromotography of the sample, using differential refractive index and DAWN laser light-scattering dual detectors, determined the number average molecular weight (Mn) and weight average molecular weight (Mw) of the polymer to be 135,900 and 139,400, respectively, for a dispersity (Mw/Mn) of 1.08.

EXAMPLE 2

Hydrogenation of Central Polybutadiene Block of Isoprene-Butadiene-Isoprene Triblock This example illustrates the selective hydrogenation of the central polybutadiene block of an isoprene-butadiene-isoprene triblock polymer.

One hundred milliliter (ml) of cyclohexane containing 8 grams of dissolved triblock polymer as prepared in Example 1 was introduced into a PARR shaker hydrogenation apparatus. This amount of polymer represents 0.142 moles of polybutadiene unsaturation. The hydrogenation catalyst was prepared by adding 10.8 ml of a nickel octoate solution (6% by weight nickel) to a solution of 45.2 millimoles of triethyl aluminum in 102.2 ml of hexane. The nickel octoate was added slowly (over about 1 hour) using a syringe pump to give a final catalyst solution which was 0.1 molar in nickel and had an Al/N molar ratio of 3.6/1.0. The shaker apparatus was purged 4 times with hydrogen gas, sealed, heated and pressured to 50 psig with hydrogen. Temperature was maintained at 50° C. and the reaction vessel was shaken for four hours. Analysis of an aliquot of the product by FTIR demonstrated complete loss of absorption related to the 1,2-butadiene (910 and 994 cm$^{-1}$) and trans 1,4-butadiene (967 cm$^{-1}$), but retention of absorption related to 3,4-isoprene (vinylidene) structure (888 cm$^{-1}$). The reaction mixture was degassed and treated with 3-4 drops of Jeffamine D-2000 (a polyether diamine and 1 ml of HCl (6N). After stirring for a short time, the dark catalyst color had discharged and the solution was added to 200 ml of isopropanol containing an antioxidant (0.5 g of Irganox 1076). The precipitated polymer was isolated and dried in a vacuum oven. Analysis of the polymer indicated essentially no residual nickel (less than 1 ppm).

EXAMPLE 3

Isoprene/Styrene-Butadiene-Isoprene/Styrene Triblock Polymer

This example illustrates the preparation of a triblock polymer wherein the terminal blocks consist of isoprene-styrene copolymers. Incorporation of low levels of styrene into the end block is beneficial with certain methods of vulcanizing the final selectively hydrogenated triblock.

520 grams of cyclohexane, 7.4 ml of tetrahydrofuran, 5 grams of isoprene and 5 grams of styrene were charged into a clear, dry one gallon autoclave kept under a 5 psig N$_2$ pressure. The contents were stirred (1500 rpm) and warmed to 55° C. Polymerization was initiated by the addition of 3.6 ml of a 1.6N solution of n-butyl lithium. The reaction was allowed to proceed for two hours (over 10 half times) at which time 1536 g of cyclohexane (pre-titrated with BuLi to a dipyridyl end point) were added to the reactor. Butadiene (400 ml) was pumped as a liquid into the reactor. Cooling water was employed as necessary to maintain 55° C. Polymerization of the butadiene was complete in one hour. The formed diblock was then coupled by the addition of 2.75 millimoles of phenyl benzoate as a 0.1 molar solution in cyclohexane. After 0.5 hour reaction time the final polymer was pressured from the reactor. Total solids measurement confirmed 100% monomer conversion. A small sample was isolated for analysis by precipitation in isopropanol. The vinyl (1,2-) content of the butadiene center block was shown to be 52% by FTIR. A GPC analysis using the Dawn detector showed:

$$M_n = 93,470$$
$$M_w = 96,210$$
$$\frac{M_w}{M_n} = 1.03$$

The magnitude of the molecular weight and narrowness of the molecular weight distribution confirm the success of the coupling reaction.

EXAMPLE 4

Hydrogenation of Example 3 Triblock Polymer

This example demonstrates the hydrogenation of the triblock polymer prepared substantially in the manner of Example 3, utilizing a catalyst prepared in a different manner than that described in Example 2.

A 400 ml pressure bottle containing a magnetic stir bar was capped with a rubber liner and two-holed bottle cap. To the bottle was added 160 ml of cyclohexane and 21.6 ml of nickel octoate solution (6% nickel) to give 22.5 millimoles of nickel as a 0.124 molar solution. One hole of the bottle cap was pierced with a 50 ml syringe, with syringe lock, containing 46.4 ml of 1.73 molar triethyl aluminum (80.27 millimoles). The other hole was pierced with a flexible neddle cannula whose other end was submersed in mineral oil. While the contents of the bottle were stirred, the triethylaluminum solution was added as rapidly as possible without allowing the contents of the bottle to boil. The resultant homogenous dark solution was 0.1 molar in nickel and 0.36 molar in aluminum. This order of addition is the reverse of that reported by Falk and, in addition to being less time consuming, appears to give a catalyst with superior reproduceability and lifetime.

Into a one gallon autoclave was charged 155 grams of the triblock polymer prepared substantially in the manner of Example 3 as a 7.5 wt. percent solution in cyclohexane. This amount of polymer contained 2.75 moles of unsaturation from the polybutadiene segment. Ethoxy acetic acid (3.1 ml of 0.1M) was added and stirred at 1500 rpm for 0.5 hours to complete the complex with the Li cation. To this solution was added 70 ml of the catalyst solution prepared above. The reactor was sparged several times with hydrogen and then pressured to 70 pounds with hydrogen and warmed to 55° C. Several other catalyst additions, totalling 60 more ml, followed. After 4 hours, only the vinylidene (3,4-microstructure) unsaturation was observeable by FTIR. After hydrogenation, the polymer solution was shortstopped and the polymer was isolated as described in Example 2. The polymer contained less than 1 ppm of residual nickel; its $M_n$ was 118,500, the $M_w$ was 129,000 and the $M_w/M_n = 1.09$.

The $M_n$ of the starting polymer was 110,000, its $M_w$ was 112,900, with $M_w/M_n = 1.03$.

Thermogravimetric analysis (TGA) of a sample of this hydrogenated polymer in nitrogen showed that only 10% of the polymer weight was lost at 435° C. and that TGA in oxygen resulted in a 10% weight loss at 360° C. (10 degree temperature rise per minute). The $T_g$ of the elastomer was −60° C.

These results illustrate the execellent thermal and oxidative stability of the polymers of this invention.

EXAMPLE 5

Comparison of Example 4 Polymer With Commercial EPDM Rubbers

This example compares properties of the triblock polymer of Example 4 and two commercial EPDM rubbers with and without calcium carbonate filler (Multiflex MM).

The curatives (vulcanizing agents) used are known to those skilled in the art and are identified in the previously-cited references. The ingredients listed below were mixed in a Brabender extruder at 50 rpm allowing the temperature to rise to about 100° C. The samples were cured in a Carver press for one hour at 160° C. under 6000 psi pressure and allowed to stand at least 24 hours at room temperature prior to testing. The results reported below are, in each case, the average obtained from two separate but identical mixes.

TABLE 1

| Ingredients | RUN A | B | C | D | E |
|---|---|---|---|---|---|
| MIX RECIPE | | | | | |
| ELASTOMER OF EXAMPLE 4 (parts) | 100 | — | — | 100 | — |
| ROYALENE 501$^X$ (parts) | — | 100 | — | — | 100 |
| NORDEL 1470$^Y$ (parts) | — | — | 100 | — | — |
| MULTIFEX MM$^Z$ (parts/100 parts of rubber-phr) | — | — | — | 100 | 100 |
| TMTD$^i$ (phr) | 2 | 2 | 2 | 2 | 2 |
| DTDM$^{ii}$ (phr) | 1.5 | 1.5 | 1.5 | 1.5 | 1.5 |
| ZDBDC$^{iii}$ (phr) | 1.5 | 1.5 | 1.5 | 1.5 | 1.5 |
| ZDMDC$^{iv}$ (phr) | 1.5 | 1.5 | 1.5 | 1.5 | 1.5 |
| SULFUR (phr) | 0.4 | 0.4 | 0.4 | 0.4 | 0.4 |
| ZnO (phr) | 2.5 | 2.5 | 2.5 | 2.5 | 2.5 |
| STEARIC ACID (phr) | 1.5 | 1.5 | 1.5 | 1.5 | 1.5 |
| PHYSICAL PROPERTIES | | | | | |
| % Gel$^W$ | 89.3 | 88.6 | 88.4 | — | — |
| TENSILE STRENGTH (PSI) | 264 | 284 | 346 | 1210 | 782 |
| ELONGATION (%) | 738 | 410 | 435 | 1797 | 671 |

$^X$From Uniroyal Chemical Co.
$^Y$From E. I. DuPont & de Nemours and Co.
$^Z$Untreated Calcium Carbonate (From Pfizer)
$^i$TETRAMETHYL THIURAM DISULFIDE
$^{ii}$DITHIODIMORPHOLINE
$^{iii}$ZINC DIBUTYL DITHIOCARBAMATE
$^{iv}$ZINC DIMETHYL DITHIOCARBAMATE
$^W$Soxhlet Extraction By Boiling Hexane; 24 hrs: 1 gram sample The superior elongation of the elastomers of our invention is clearly evident in the filled and unfilled mixes. The high elongation is not the result of undervulcanization, as shown by the low level of extractibles in the gel determination.

EXAMPLE 6

Sequential Polymerization of Triblock Copolymer

This example illustrates the preparation of triblock polymer essentially identical to that described in Examples 3 and 4, but synthesized via sequential polymerization.

The apparatus utilized was the same as that described in Example 1. In this Example, which does not require a coupling step as earlier described, the three blocks of the polymer chain are polymerized sequentially to produce a polymer of 100,000 Mn directly. While catalyst usage is decreased in this method, the time necessary for completion of the polymerization reaction is greatly increased. It is not, therefore, the preferred technique for the production of symmetrical triblocks but does have the advantage of permitting the presence of two dissimilar end blocks, if desired.

To form the initial block, the procedures of Example 1 were followed, except that one gram of isoprene and one gram of styrene were polymerized using 1.0 millimoles of BuLi. After addition of the solvent as in Example 1, 96 grams of butadiene were added to the reactor and allowed to polymerize for one hour. One gram each of isoprene and styrene were added and the polymerization was allowed to proceed for 15 hours. This lengthly reaction time is necessary and reflects the low concentration of catalyst an monomer necessitated by the conditions in this block sequential polymerization.

Work up and hydrogenation of the polymer as in Examples 1-4 produce a selectively hydrogenated triblock having $M_n = 104,200$ and $M_w = 112,540$.

EXAMPLE 7

High Styrene Content Triblock Copolymer

This example describes the preparation of a polymer similar to that of Example 3, but having considerably higher styrene content.

To the apparatus described in Example 1 was charged 1100 ml of cyclohexane, 3 ml of 0.01 m dipyridyl, 6.5 ml of tetrahydrofuran (THF), 33 m (30 g) of styrene and 3 ml (2 g) of isoprene.

The solution was warmed to 55° C. and titrated with BuLi, and after the end point, 20 ml of 0.1 molar BuLi were added. After 2 hours, 70.3 gram of purified butadiene were added. The butadiene was allowed to polymerize for an hour and 11 ml of a 0.1M phenyl benzoate solution were added to couple the diblock. The polymer work up and hydrogenation was as previously described. The polymeric product displayed unsaturation by FTIR corresponding to vinylidene (3,4-isoprene) double bonds only. The resultant material displayed thermoplastic elastomer properties similar to polymers made without the low level of isoprene used in this example. The polymer of the example can, however, be chemically vulcanized by any normal method. Thus, the polymer of this example is both a thermoplastic elastomer when uncured and a thermoset elastomer if cured. This invention provides the use with a choice not available in heretofore existing commercial hydrocarbon elastomers and also provides an elastomer whose excellent physical properties provided by the styrene end blocks of current thermoplastic elastomers can be retained at greatly elevated temperatures (100°-150° C.).

EXAMPLE 8

Thermoplastic Ionic Elastomer

In this example, the preparation of a thermoplastic ionic elastomer utilizing a selectively hydrogenated triblock polymer as a substrate is described.

Fifty grams of triblock polymer ($M_n = 111,820$) similar to those described in Examples 1 and 2 were dissolved in 1 liter of cyclohexane. Acetyl sulfate was prepared by mixing 2.7 ml of acetic anhydride (28.6 mm) with 1 ml (18 mm) of concentrated sulfuric acid at 0° C. The formed acetyl sulfate was added dropwise with stirring to the rubber solution. After stirring at room temperature for ½ hour, the resultant product was divided into two equal portions.

To one portion (A) was added 1.85 grams of sodium acetate as a solution in methanol and water. Next, there was added 0.25 grams of Irganox 1076 axtioxidant and 12.0 grams of zinc stearate as an inolyzer. After brief stirring, the mixture was added to one liter of isopropanol to precipitate the polymer. The flocculated polymer was isolated and dried in a vacuum oven to constant weight.

The second portion (B) was treated similarly except that 4.9 grams of zinc acetate were substituted for the sodium acetate.

Both portions, (A) and (B), were individually homogenized by mixing them in a Brabender mixer. The samples were then pressed in a mold at 160° C. for 30 minutes at 6000 pounds pressure to give molded squares approximately of 70 mils thickness. The stress-strain properties of dumbells cut from the molded squares were then measured.

| Samples | A | B |
|---|---|---|
| Cations | Na$^+$ + Zn$^{+2}$ | Zn$^{+2}$ |
| Tensile, psig | 1459 | 3055 |
| Elongation, % | 1359 | 1736 |

The samples, with their widely spaced ionic domains, molded smoothly and easily. The measured elongations are far above those reported for EPDM treated in a similar manner to our polymer of the portion B where a tensile strength of 3040 psig and an elongation of only 460% were observed (e.g., IONS IN POLYMERS, Adi Eisenberg, Editor, Advances in Chemistry Series, 187 American Chemical Society, Washington, D.C. 1980, p. 42).

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A solid star-branched block polymer comprising at least two alternating blocks

I-B wherein each free end of the polymer is the block I, the block I comprises at least one polymerized conjugated diene having at least five (5) carbon atoms and the following formula

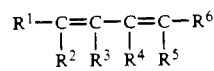 (1)

wherein R$^1$-R$^6$ are each hydrogen or a hydrocarbyl group, provided that at least one of R$^1$-R$^6$ is a hydrocarbyl group and provided that the structure of the residual double bond in the polymerized block I has the following formula

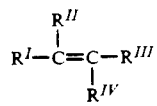 (2)

wherein R$^I$, R$^{II}$, R$^{III}$ and R$^{IV}$ are each hydrogen or a hydrocarbyl group, provided that either both R$^I$ and R$^{II}$ are hydrocarbyl groups or both R$^{III}$ and R$^{IV}$ are hydrocarbyl groups;

B is a block of a polymer of at least one conjugated diene different from the polymerized diene of the block I, having at least four (4) carbon atoms and the following formula

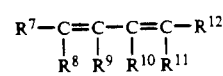 (3)

wherein R$^7$-R$^{12}$ are each hydrogen or a hydrocarbyl group, provided that the structure of the residual double bond in the polymerized block B has the following formula

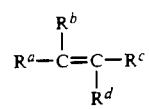 (4)

wherein R$^a$, R$^b$, R$^c$ and R$^d$ are each hydrogen (H) or a hydrocarbyl group, provided that one of R$^a$ or R$^b$ is hydrogen, one of R$^c$ or R$^d$ is hydrogen, and at least one of R$^a$, R$^b$, R$^c$ or R$^d$ is a hydrocarbyl group.

2. The polymer of claim 1 wherein said polymerized block B contains at least about 25 wt. % of 1,2-units if it is a polymer of predominantly 1,3-butadiene, and said first-named polymer is selectively hydrogenated so that each of the blocks B is substantially completely hydrogenated and thereby contains substantially none of the original unsaturation, while each of the blocks I retains a sufficient amount of its original unsaturation to vulcanize said copolymer.

3. A sulfonated polymer produced by a method comprising sulfonating the polymer of claim 2, followed by neutralization of the thus-formed polymeric sulfonic acid with metal ions or amines.

4. A maleated polymer produced by a method comprising contacting the polymer of claim 2 with maleic anhydride.

5. A halogenated polymer produced by a method comprising halogenating the polymer of claim 2.

6. A solid star-branched block polymer comprising at least two alternating blocks

A-D wherein each free end of the polymer is the block A, and the block A is a copolymer of at least one aryl-substituted olefin and at least one conjugated diene having at least five (5) carbon atoms and the following formula

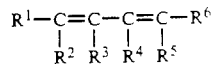 (1)

wherein $R^1$-$R^6$ are each hydrogen or a hydrocarbyl group, provided that at least one of $R^1$-$R^6$ is a hydrocarbyl group and provided that the structure of the residual double bond in the polymerized block I has the following formula

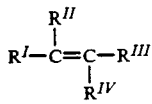 (2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

D is a block polymer of a conjugated diene, different from that used to polymerize the block A, having at least four (4) carbon atoms and the following formula

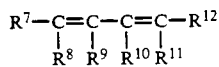 (3)

wherein $R^7$-$R^{12}$ are each hydrogen or a hydrocarbyl group, provided that the structure of the residual double bond in the polymerized block D has the following formula

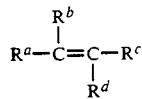 (4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen, and at least one of $R^a$, $R^b$, $R^c$ or $R^d$ is a hydrocarbyl group.

7. The polymer of claim 5 wherein said polymerized block D contains at least about 25 wt. % of 1,2- units if it is a polymer of predominantly 1,3-butadiene, and said first-named polymer is selectively hydrogenated so that each of the blocks D is substantially completely hydrogenated and thereby contains substantially none of the original unsaturation, while each of the blocks A retains a sufficient amount of its original unsaturation to vulcanize said copolymer.

8. A sulfonated polymer produced by a method comprising sulfonating the polymer of claim 7, followed by neutralization of the thus-formed polymeric sulfonic acid with metal ions or amines.

9. A maleated polymer produced by a method comprising contacting the polymer of claim 7 with maleic anhydride.

10. A halogenated polymer produced by a method comprising halogenating the polymer of claim 7.

11. A solid star-branched block polymer comprising at least three alternating blocks

I-D-A wherein each free end of the polymer is either the I or the A block, and the block I is polymerized from at least one conjugated diene having at least five (5) carbon atoms and the following formula

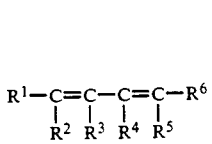 (1)

wherein $R^1$-$R^6$ are each hydrogen or a hydrocarbyl group, provided that at least one of $R^1$-$R^6$ is a hydrocarbyl group and provided that the structure of the residual double bond in the polymerized block I has the following formula

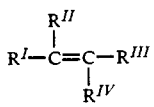 (2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

D is a block polymer of a conjugated diene, different from that use to polymerize the block I, having at least four (4) carbon atoms and the following formula

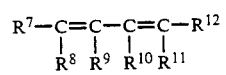 (3)

wherein $R^7$-$R^{12}$ are each hydrogen or a hydrocarbyl group, provided that the structure of the residual double bond in the polymerized block D has the following formula

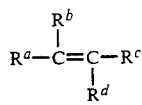 (4)

wherein $R^a$, $R^b$, $R^c$ and $R^d$ are each hydrogen (H) or a hydrocarbyl group, provided that one of $R^a$ or $R^b$ is hydrogen, one of $R^c$ or $R^d$ is hydrogen, and at least one of $R^a$, $R^b$, $R^c$ or $R^d$ is a hydrocarbyl group;

A is a copolymer of at least one aryl-substituted olefin and at least one conjugated diene having at least five (5) carbon atoms and the following formula

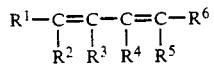 (1)

wherein $R^1$-$R^6$ are each hydrogen or a hydrocarbyl group, provided that at least one of $R^1$-$R^6$ is a hydrocarbyl group and provided that the structure of the residual double bond in the polymerized block I has the following formula

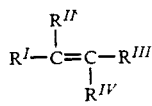 (2)

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups.

12. The polymer of claim 11 wherein said polymerized block D contains at least about 25 wt. % of 1,2-units if it is a polymer of predominantly 1,3-butadiene, and said first-named polymer is selectively hydrogenated so that each of the blocks D is substantially completely hydrogenated and thereby contains substantially none of the original unsaturation, while each of the blocks I and A retains a sufficient amount of its original unsaturation to vulcanize said copolymer.

13. A sulfonated polymer produced by a method comprising sulfonating the polymer of claim 12 followed by neutralization of the thus-formed polymeric sulfonic acid with metal ions or amines.

14. A maleated polymer produced by a method comprising contacting the polymer of claim 12 with maleic anhydride.

15. A halogenated polymer produced by a method comprising halogenating the polymer of claim 12.

16. A solid star-branched block copolymer wherein each branch comprises at least two (2) alternating blocks bonded to each other, the free end of each branch being a block of at least one polymerized hyrocarbon conjugate diene (I) monomer containing at least five (5) carbon atoms, with at least one carbon atom of each pair of residual double-bonded carbon atoms of polymerized conjugated diene (I) units being additionally single-bonded to two carbon atoms, or a copolymer of at least one diene (I) and at least one aryl-substituted olefin, the blocks adjacent to said polymerized diene (I) containing blocks being a polymer of at least one polymerized hydrocarbon conjugated diene (B), which is different from conjugated diene (I) and contains at least four (4) carbon atoms, with each residual double-bonded carbon atom of polymerized conjugated diene (B) units being additionally bonded to a hydrogen atom.

17. The copolymer of claim 16 wherein polymerized diene (B)-containing blocks additionally comprise at least about 25 wt. % of 1,2-units if they are a polymer of predominantly 1,3-butadiene, and said block copolymer is selectively hydrogenated so that said polymerized conjugated diene (B) units are substantially completely hydrogenated and contain substantially none of the original unsaturation, while said polymerized conjugated diene (I) units retain sufficient amount of their original unsaturation to vulcanize said copolymer.

18. The copolymer of claim 17 wherein diene (I) is isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimetyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene or mixtures thereof.

19. The copolymer of claim 18 wherein diene (I) is isoprene, myrcene or 2-methyl-1,3-pentadiene.

20. The copolymer of claim 19 wherein diene (I) is isoprene.

21. The copolymer of claim 17 wherein diene (B) is 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene or mixtures thereof.

22. The copolymer of claim 21 wherein diene (B) is 1,3-butadiene, 1,3-pentadiene, 2,4-hexadiene or 1,3-hexadiene.

23. The copolymer of claim 22 wherein diene (B) is 1,3-butadiene.

24. The copolymer of claim 23 wherein each of the (B) polymer blocks, prior to the selective hydrogenation reaction, has about 30 to about 90% wt. of the 1,2-units.

25. The copolymer of claim 24 wherein each of the (B) polymer blocks, prior to the selective hydrogenation reaction, has about 45 to about 65% wt. of the 1,2-units.

26. The copolymer of claim 17 wherein said free end of each branch is a copolymer of said diene (I) and at least one aryl-substituted olefin selected from the group consisting of styrene, alpha-methyl styrene, and 1,1-diphenylethylene.

27. The copolymer of claim 17 wherein, after the hydrogenation reaction, the Iodine Number of the (I) polymer blocks is about 10 to about 100% of the Iodine Number prior to the hydrogenation reaction.

28. The copolymer of claim 27 wherein, after the hydrogenation reaction, the Iodine Number of the (I) polymer blocks is about 25 to about 100% of the Iodine Number prior to the hydrogenation reaction.

29. The copolymer of claim 28 wherein, after the hydrogenation reaction, the Iodine Number of the (I) polymer blocks is about 50 to about 100% of the Iodine Number prior to the hydrogenation reaction.

30. The copolymer of claim 29 wherein, after the hydrogenation reaction, the Iodine Number of the (B) polymer blocks is about 0 to about 10% of the Iodine Number prior to the hydrogenation reaction.

* * * * *